US011865057B2

(12) United States Patent
Morris et al.

(10) Patent No.: US 11,865,057 B2
(45) Date of Patent: Jan. 9, 2024

(54) PORTABLE CONFINEMENT DEVICE

(71) Applicant: Abram's Nation, LLC, Gibsonia, PA (US)

(72) Inventors: Rose Morris, Wexford, PA (US); Jeff Morris, Pittsburgh, PA (US)

(73) Assignee: Abram's Nation, LLC, Gibsonia, PA (US)

( * ) Notice: Subject to any disclaimer, the term of this patent is extended or adjusted under 35 U.S.C. 154(b) by 0 days.

(21) Appl. No.: 17/607,171

(22) PCT Filed: Apr. 29, 2020

(86) PCT No.: PCT/US2020/030443
§ 371 (c)(1),
(2) Date: Oct. 28, 2021

(87) PCT Pub. No.: WO2020/223330
PCT Pub. Date: Nov. 5, 2020

(65) Prior Publication Data

US 2022/0225785 A1 Jul. 21, 2022

Related U.S. Application Data

(60) Provisional application No. 62/839,972, filed on Apr. 29, 2019.

(51) Int. Cl.
*A61G 7/05* (2006.01)
*A47C 21/08* (2006.01)
(Continued)

(52) U.S. Cl.
CPC ............ *A61G 7/0526* (2013.01); *A47C 21/00* (2013.01); *A47C 21/08* (2013.01); *A47C 29/003* (2013.01); *A47D 13/061* (2013.01); *A47D 13/063* (2013.01)

(58) Field of Classification Search
CPC ...... A61G 7/0526; A47C 21/00; A47C 21/08; A47C 29/003; A47D 13/061; A47D 13/063; E04H 15/48; E04H 15/02; E04H 15/42
(Continued)

(56) References Cited

U.S. PATENT DOCUMENTS 2,975,792 A 3/1961 Herbert et al.
3,171,417 A 3/1965 Stokes
(Continued)

FOREIGN PATENT DOCUMENTS

CN 101228329 A 7/2008
EP 0704566 A1 4/1996
EP 704586 A1 * 4/1996 ............ E04H 15/40

OTHER PUBLICATIONS

"Anna's Tent Bed", AICARDI Syndrome Foundation, http://www.aicardisyndrome.org/site/node301, (last accessed Dec. 22, 2008).
(Continued)

*Primary Examiner* — Robert Canfield
(74) *Attorney, Agent, or Firm* — The Webb Law Firm

(57) ABSTRACT

A portable confinement device for confining a person upon a mattress is provided. The device includes a frame and a flexible enclosure. The frame includes a base member and at least two upright members. The upright members include support portions and bridge portions connecting the support portions. The bridge portions are connected to the support portions by lockable hinges. When the hinges are locked, the bridge portions are in an upright position. When the hinges are unlocked, the bridge portions are in a downward, lowered position. The enclosure is supported by and sits upon the frame to stabilize the device from tipping over. A mattress may be received into the interior space of the
(Continued)

enclosure. The enclosure includes an opening for allowing a person to enter or exit the interior space of the enclosure.

23 Claims, 36 Drawing Sheets

(51) Int. Cl.
*A47C 29/00* (2006.01)
*E04H 15/48* (2006.01)
*E04H 15/02* (2006.01)
*A47C 21/00* (2006.01)
*A47D 13/06* (2006.01)

(58) Field of Classification Search
USPC .... 135/116, 130, 136–138, 143, 144; 5/414, 5/424, 425, 620
See application file for complete search history.

(56) References Cited

U.S. PATENT DOCUMENTS

| | | | | |
|---|---|---|---|---|
| 3,584,322 | A * | 6/1971 | McDougall | A47C 29/006 135/96 |
| 3,703,181 | A * | 11/1972 | Tholen | E04H 15/06 135/904 |
| 3,763,507 | A * | 10/1973 | Propst | A47D 7/00 5/100 |
| 4,044,411 | A * | 8/1977 | Peterson | A47D 13/063 5/99.1 |
| 4,066,089 | A * | 1/1978 | Rainwater | E04H 15/48 135/117 |
| 4,244,384 | A * | 1/1981 | Bean | E04H 15/38 52/63 |
| 4,271,856 | A | 6/1981 | Ferguson | |
| 4,531,330 | A | 7/1985 | Phillips | |
| 4,852,598 | A | 8/1989 | Griesenbeck | |
| 5,210,888 | A | 5/1993 | Canfield | |
| 5,384,925 | A | 1/1995 | Vail | |
| 5,449,014 | A | 9/1995 | Yan-Ho | |
| 5,622,198 | A * | 4/1997 | Elsinger | E04H 15/48 135/128 |
| 5,784,732 | A | 7/1998 | Vail | |
| 6,123,091 | A | 9/2000 | Flynn et al. | |
| 6,216,291 | B1 | 4/2001 | Eads et al. | |
| 6,263,529 | B1 | 7/2001 | Chadwick et al. | |
| 6,487,735 | B1 | 12/2002 | Jacques, II et al. | |
| 6,687,930 | B1 | 2/2004 | Eads et al. | |
| 6,728,981 | B1 | 5/2004 | Gutierrez | |
| 6,772,458 | B2 | 8/2004 | Ellen et al. | |
| 6,799,339 | B2 | 10/2004 | Stewart | |
| 6,952,844 | B2 | 10/2005 | Danaher | |
| 7,047,991 | B2 | 5/2006 | Kline | |
| 7,062,806 | B2 | 6/2006 | Merlin | |
| 7,174,584 | B2 | 2/2007 | Danaher | |
| 7,383,849 | B2 | 6/2008 | Kline | |
| 7,392,555 | B2 | 7/2008 | Danaher | |
| 7,434,280 | B2 | 10/2008 | Cyr | |
| 8,776,812 | B1 * | 7/2014 | Forget | E04H 15/56 135/96 |
| 9,850,681 | B2 * | 12/2017 | Le | A47C 17/70 |
| 2004/0065361 | A1 * | 4/2004 | Pratt | E04H 15/324 135/148 |
| 2005/0235418 | A1 | 10/2005 | Jacques, II et al. | |
| 2006/0168722 | A1 * | 8/2006 | Ramirez | A61G 7/0526 5/98.1 |
| 2006/0266399 | A1 | 11/2006 | Ferrari | |
| 2007/0294827 | A1 | 12/2007 | Carr et al. | |
| 2010/0243012 | A1 * | 9/2010 | Lindeman | E04H 15/02 135/88.13 |
| 2011/0048481 | A1 | 3/2011 | Morris et al. | |
| 2012/0117926 | A1 * | 5/2012 | Miller | A47C 21/08 53/473 |
| 2013/0192653 | A1 * | 8/2013 | Watson | E04H 15/48 135/139 |
| 2015/0292231 | A1 | 10/2015 | Gardner et al. | |
| 2016/0143451 | A1 | 5/2016 | Le | |
| 2019/0099011 | A1 | 4/2019 | Ling et al. | |
| 2021/0030167 | A1 * | 2/2021 | Thiel | A47D 13/061 |

OTHER PUBLICATIONS

"Children's Play Bed Tents", Tinker Tots Inc., http://www.tinkertots.com/drcatwplbedt.html, (last accessed Dec. 22, 2008).
"Enclosed Bed", EnableDesign Co., LLC, http://www.enabledesignco.com/enclosedbed.html, (last accessed Dec. 8, 2008).
"Safe Care—An Enclosure System Ideal for Home or Long-Term Care Use", Safe-T Care Manufacturing, Inc., http://www.safe-tcare.com/tc-enclosure-system.html, (last accessed Dec. 22, 2008).
"Special Beds", Isis Medical, Inc., www.isismed.net/special_beds.html, (last accessed Dec. 22, 2008).
"The Posey Bed: An Enclosure System for At-Risk Patients", Posey Company, Arcadia, CA, (last accessed Dec. 23, 2008).
Abram'S Nation, LLC, Changing the Coverlet of Your Safety Sleeper, https://www.youtube.com/watch?v=QngPnj1YkfA, May 15, 2015, accessed Jun. 5, 2023.

* cited by examiner

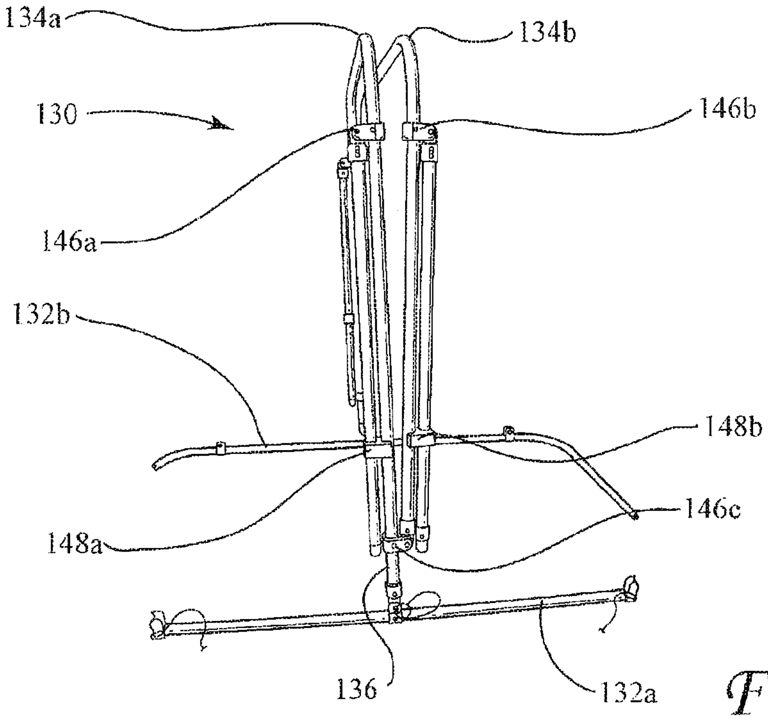
*Fig. 13*
*Fig. 14*
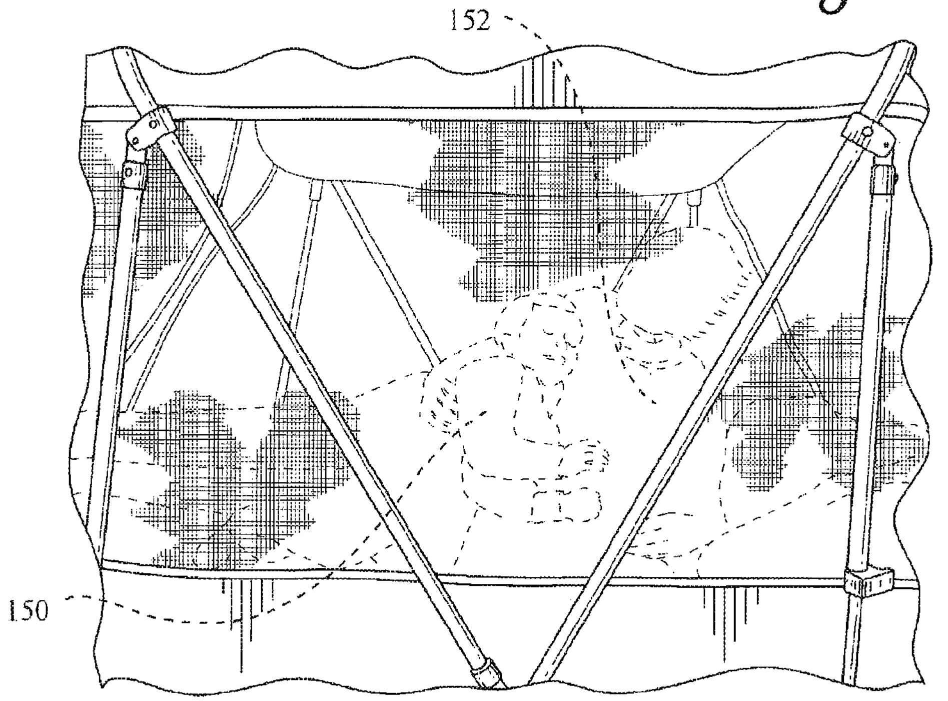

PORTABLE CONFINEMENT DEVICE

CROSS-REFERENCE TO RELATED APPLICATIONS

This application is the United States national phase of International Application No. PCT/US2020/030443 filed Apr. 29, 2020, and claims priority to United States Provisional Patent Application No. 62/839,972 filed Apr. 29, 2019, the disclosures of which are hereby incorporated by reference in their entirety.

BACKGROUND OF THE DISCLOSURE

Field of the Invention

The invention relates to a portable confinement device for confining a person upon a mattress. The device is useful for taking care of children and adults who need to be kept from wandering away from their sleeping or resting areas.

Description of Related Art

The need for the confinement of a person may result from some form of mental or physical ailment that makes it necessary for a caregiver to be assured of the person's whereabouts at sleep or resting times. The confinement device may also provide a person extra security due to their mental or physical ailment allowing that person to feel the comfort and security necessary in order to properly rest. Numerous schemes and devices have been designed in order to restrict an individual's movement to some degree during sleep. However, these devices often fail to provide a caregiver the ability to determine when it is safe for the confined individual to exit the device.

Numerous devices that serve to confine an individual are burdensome, bulky, and expensive, often being designed for hospital or clinical use. They take a lot of effort to assemble and are difficult to transport from place to place when necessary. As such, this field has, up until now, an unmet need for a cheap, safe, portable, and easy-to-assemble device for confining an individual during sleep or play. There is a further unmet need for an adjustable device that is capable of opening further to allow an individual to enjoy the confines of the device without being fully confined therein.

SUMMARY OF THE DISCLOSURE

The present disclosure satisfies the foregoing needs by providing a novel portable confinement device which is useful for confining a child or an adult while they are sleeping, resting, relaxing, or playing, without the use of straps or other body attachments. Moreover, while the durable construction of the present invention permits it to be used every day in the confined person's home, its portability allows it to be easily transported and used on trips away from the home. This feature provides the confined person with the security and comfort of familiar surroundings even when spending nights away from home.

The present disclosure provides embodiments of a portable confinement device for confining a person upon a mattress. The confinement device may include a frame which may include a base member having a first side and a second side parallel to the first side and set apart from the first side at a distance, and at least two upright members, each upright member having a first support portion, a second support portion, and a bridge portion, the bridge portion having a first leg, a second leg parallel to the first leg, and a cross member connecting the first and second legs, wherein the first leg and the second leg are respectively connected to the first support portion and the second support portion by a lockable hinge, and wherein when the hinges are locked, the bridge portion is configured to be in an upright position, and when the hinges are unlocked, the bridge portion is rotatable into a downward, lowered position: and a flexible enclosure which may have a floor, four sides, and a roof defining an interior space, wherein the flexible enclosure is configured to be supported by the frame and adapted to receive the mattress therein, and wherein a first fastenable opening extends across at least one of the four sides and the roof in order to permit a person to enter and exit the interior space when the bridge portion is in either the upright or the downward, lowered positions.

In another embodiment of the present disclosure, the base member may also have a third side and a fourth side interconnecting the first side and the second side. The third side and the fourth side of the base member interconnect the first side and the second side by way of a swaged connection. The cross members of the at least two upright members may connect to the first leg and the second leg of the at least two upright members by way of a swaged connection. At least four stabilizing members may be removably attached to the base member and one of the first support portions or the second support portions. The frame may further include a plurality of eye-and-pin connectors in order to connect the at least two upright members to the base member.

In another embodiment of the present disclosure, when the bridge portion is in the upright position, the at least two upright members and the mattress may form a substantially hexagonal shape. When the bridge portion is in the upright position, the at least two upright members and the mattress may form a substantially rectangular shape. The lockable hinges may be button hinges. The flexible enclosure may include at least one access port. The at least one access port may be configured to connect to an assistance device for use by a person confined in the portable confinement device. The flexible enclosure may further include a plurality of pockets for receiving at least a portion of the bridge portions of the at least two upright members therein. The enclosure may have a fastenable second opening through which the mattress may be placed into or removed from the enclosure interior space.

In another embodiment of the present disclosure, the flexible enclosure may further include a pocket defined by a top side of the floor of the flexible enclosure and a mattress covering. The mattress covering may create a floor of the interior space and may be configured to prevent the person confined by the interior space from accessing the mattress. The flexible enclosure may further include a second fastenable opening on at least one of the four sides. The second fastenable opening may be configured to permit a person to enter and exit the interior space when the bridge portion is in the upright position. When the lockable hinges are locked, the bridges may be set apart by a first distance, and when the lockable hinges are unlocked, the bridges may be set apart by a second distance, greater than the first distance.

In another embodiment of the present disclosure, a portable confinement device for confining a person upon a mattress may include a mattress; a frame which may include a base section interconnected to a first upright portion and a second upright portion, wherein the first and second upright portions further comprise a first leg, a second leg, and a bridge interconnected to the first and second legs by two lockable hinges, the bridges being set apart by a distance;

and a flexible enclosure which may include a floor, four sides, and a roof defining an interior space, wherein the flexible enclosure is configured to be supported by the frame and adapted to receive the mattress, and wherein at least one of the four sides and the roof has a fastenable first opening to permit a person to enter and exit the interior space, and wherein when the hinges are locked, the bridges are set apart by a first distance, and when the hinges are unlocked, the bridges are set apart by a second distance, greater than the first distance.

In another embodiment of the present disclosure, the two lockable hinges may be button hinges. The flexible enclosure may further include at least one access port. The at least one access port may be configured to connect to an assistance device for use by a person confined in the portable confinement device. When the hinges are unlocked, the fastenable first opening may be configured to expose the entirety of the mattress.

In another embodiment of the present disclosure a method of operating a portable confinement device may include the steps of providing a frame, the frame including a base section interconnected to a first upright portion and the second upright portion, the first and second upright portions may include a first leg, a second leg, and a bridge extending therebetween, the bridge being connected to the first and second legs by two lockable hinges; attaching a flexible enclosure to at least the bridges of the first and second upright portions, the flexible enclosure may include a floor, four sides, and a roof defining an interior space configured to receive a mattress therein; unfastening a fastenable opening of the flexible enclosure to expose the interior space, the fastenable opening may extend across at least one of the four sides and the roof of the flexible enclosure; and unlocking the lockable hinges so that the bridge portions may rotate from an upright position into a downward, lowered position. The lockable hinges may be button hinges. The step of unlocking the lockable hinges may further include the step of removing a locking pin from each of the hinges.

In some embodiments or aspects, the present disclosure may be characterized by one or more of the following numbered clauses:

Clause 1. A portable confinement device for confining a person upon a mattress, the device comprising: a frame comprising: a base member having a first side and a second side parallel to the first side and set apart from the first side at a distance; and at least two upright members, each upright member having a first support portion, a second support portion, and a bridge portion, the bridge portion having a first leg, a second leg parallel to the first leg, and a cross member connecting the first and second legs, wherein the first leg and the second leg are respectively connected to the first support portion and the second support portion by lockable hinges, and wherein, when the hinges are locked, the bridge portion is configured to be in an upright position, and when the hinges are unlocked, the bridge portion is rotatable into a downward, lowered position; and a flexible enclosure having a floor, four sides, and a roof defining an interior space, wherein the flexible enclosure is configured to be supported by the frame and adapted to receive a mattress, and wherein at least one of the four sides and the roof has a fastenable first opening to permit a person to enter and exit the interior space when the bridge portion is in either the upright or downward position.

Clause 2. The portable confinement device of clause 1, wherein the base member further comprises a third side and a fourth side interconnecting the first side and the second side.

Clause 3. The portable confinement device of clause 1 or 2, wherein the third side and the fourth side of the base member interconnect the first side and the second side by way of a swaged connection.

Clause 4. The portable confinement device of any of clauses 1-3, wherein the cross members of the at least two upright members connect to the first leg and the second leg of the at least two upright members by way of a swaged connection.

Clause 5. The portable confinement device of any of clauses 1-4, further comprising at least four stabilizing members removably attached to the base member and one of the first support portions or the second support portions.

Clause 6. The portable confinement device of any of clauses 1-5, wherein the frame further comprises a plurality of eye-and-pin connectors in order to connect the at least two upright members to the base member.

Clause 7. The portable confinement device of any of clauses 1-6, wherein, when the bridge portion is in the upright position, the at least two upright members and the mattress form a substantially hexagonal shape.

Clause 8. The portable confinement device of any of clauses 1-7, wherein, when the bridge portion is in the upright position, the at least two upright members and the mattress form a substantially rectangular shape.

Clause 9. The portable confinement device of any of clauses 1-8, wherein the lockable hinges are button hinges.

Clause 10. The portable confinement device of any of clauses 1-9, wherein the flexible enclosure further comprises at least one access port.

Clause 11. The portable confinement device of any of clauses 1-10, wherein the at least one access port is configured to connect to an assistance device for use by a person confined in the portable confinement device.

Clause 12. The portable confinement device of any of clauses 1-11, wherein the flexible enclosure further comprises a plurality of pockets for receiving at least a portion of the bridge portions of the at least two upright members therein.

Clause 13. The portable confinement device of any of clauses 1-12, wherein the enclosure has a fastenable second opening through which the mattress may be placed into or removed from the enclosure interior space Clause 14. The portable confinement device of any of clauses 1-13, wherein the flexible enclosure further comprises a pocket defined by a top side of the floor of the flexible enclosure and a mattress covering, wherein the mattress covering creates a floor of the interior space and is configured to prevent the person confined by the interior space from accessing the mattress.

Clause 15. The portable confinement device of any of clauses 1-14, wherein the flexible enclosure further comprises a second fastenable opening on at least one of the four sides, wherein the second fastenable opening is configured to permit a person to enter and exit the interior space when the bridge portion is in the upright position.

Clause 16. The portable confinement device of any of clauses 1-15, wherein, when the lockable hinges are locked, the bridges are set apart by a first distance, and when the lockable hinges are unlocked, the bridges are set apart by a second distance, greater than the first distance.

Clause 17. A portable confinement device for confining a person upon a mattress, the portable confinement device comprising: a mattress; a frame comprising a base section interconnected to a first upright portion and a second upright portion, wherein the first and second upright portions further comprise a first leg, a second leg, and a bridge interconnected to the first and second legs by two lockable hinges, the bridges being set apart by a distance; and a flexible enclosure having a floor, four sides, and a roof defining an interior space, wherein the flexible enclosure is configured to be supported by the frame and adapted to receive the mattress, and wherein at least one of the four sides and the roof has a fastenable first opening to permit a person to enter and exit the interior space, wherein, when the hinges are locked, the bridges are set apart by a first distance, and when the hinges are unlocked, the bridges are set apart by a second distance, greater than the first distance.

Clause 18. The portable confinement device of clause 16, wherein the two lockable hinges are button hinges.

Clause 19. The portable confinement device of clause 16 or 17, wherein the flexible enclosure further comprises at least one access port.

Clause 20. The portable confinement device of any of clauses 16-18, wherein the at least one access port is configured to connect to an assistance device for use by the person confined in the portable confinement device.

Clause 21. The portable confinement device of any of clauses 16-19, wherein, when the hinges are unlocked, the fastenable first opening is configured to expose the entirety of the mattress.

Clause 22. A method of operating a portable confinement device, the method comprising the steps of: providing a frame, the frame comprising a base section interconnected to a first upright portion and the second upright portion, the first and second upright portions comprising a first leg, a second leg, and a bridge extending therebetween, the bridge being connected to the first and second legs by two lockable hinges; attaching a flexible enclosure to at least the bridges of the first and second upright portions, the flexible enclosure comprising a floor, four sides, and a roof defining an interior space configured to receive a mattress therein; unfastening a fastenable opening of the flexible enclosure to expose the interior space, the fastenable opening extending across at least one of the four sides and the roof of the flexible enclosure; and unlocking the lockable hinges so that the bridge portions rotate from an upright position into a downward, lowered position.

Clause 23. The method of operating a portable confinement device of clause 22, wherein the lockable hinges are button hinges.

Clause 24. The method of operating a portable confinement device of either of clause 22 or 23, wherein unlocking the lockable hinges further comprises the step of removing a locking pin from each of the hinges.

BRIEF DESCRIPTION OF THE DRAWINGS

FIG. 13 is a perspective view of a partially assembled frame of a portable confinement device according to an embodiment of the present disclosure.

FIG. 14 is a side view of a portable confinement device according to an embodiment of the present disclosure.

DETAILED DESCRIPTION OF THE DISCLOSURE

Figure 1:
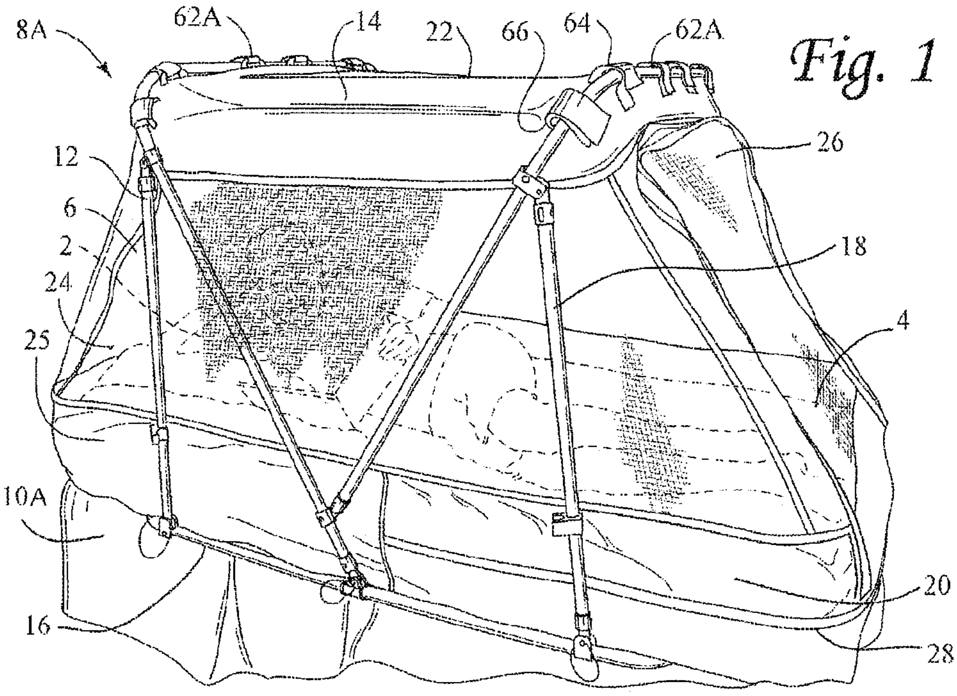
FIG. 1 is a perspective view of a portable confinement device according to an embodiment of the present disclosure, supported by a box spring, showing a confined person relaxing within the device.

As used herein, the singular forms of "a", "an" and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting, as the disclosure can assume various alternative orientations.

All numbers and ranges used in the specification and claims are to be understood as being modified in all instances by the term "about". However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C. or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Referring to FIG. 1, there is shown a person 2 relaxing upon a mattress 4 within the interior space 6 of a portable confinement device 8A according to an embodiment of the present invention. The confinement device 8A is sitting upon a skirted box spring support 10A. The confinement device 8A has a frame 12 and a flexible enclosure 14. The frame 12 has a base 16 and an upright portion 18. The top of the enclosure 14 is suspended from the upright portion 18, while the bottom of the enclosure 8A rests upon the base 16 to stabilize the confinement device 8A from tipping over. The sides 20 and the roof 22 of the enclosure 14 have mesh windows 24 to provide ventilation and light to the interior space 6. There is a fastenable opening 26 in one of the sides 20 to allow the person 2 to enter and leave the interior space 6. There is also a second fastenable opening 28 for inserting the mattress 4 into the interior space 6.

Figure 2:
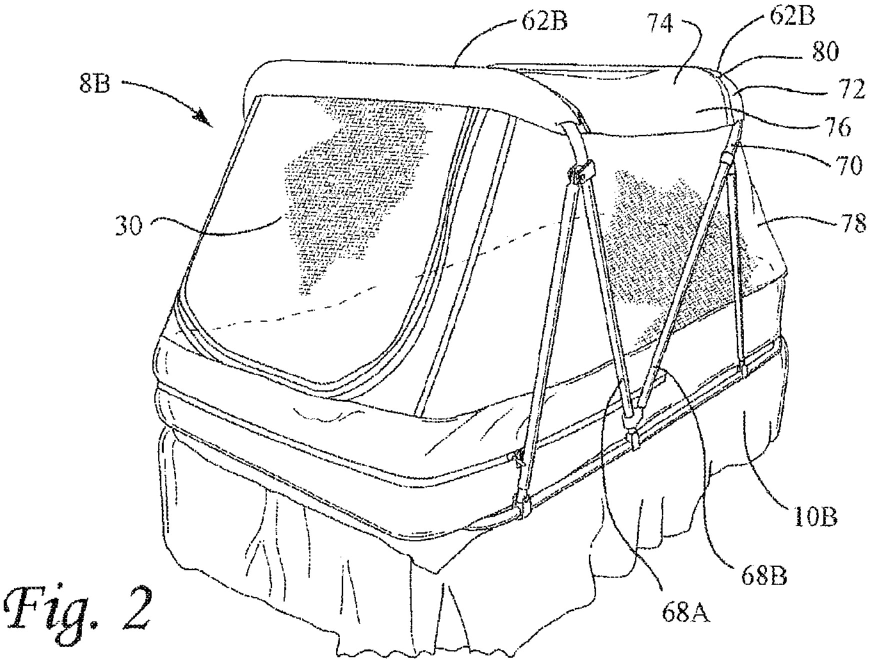
FIG. 2 is a perspective view of a portable confinement device according to another embodiment of the present disclosure, supported by a box spring.

Referring now to FIG. 2, there is shown another portable confinement device 8B according to another embodiment of the present invention sitting upon a skirted box spring support 10B.

Figure 3:
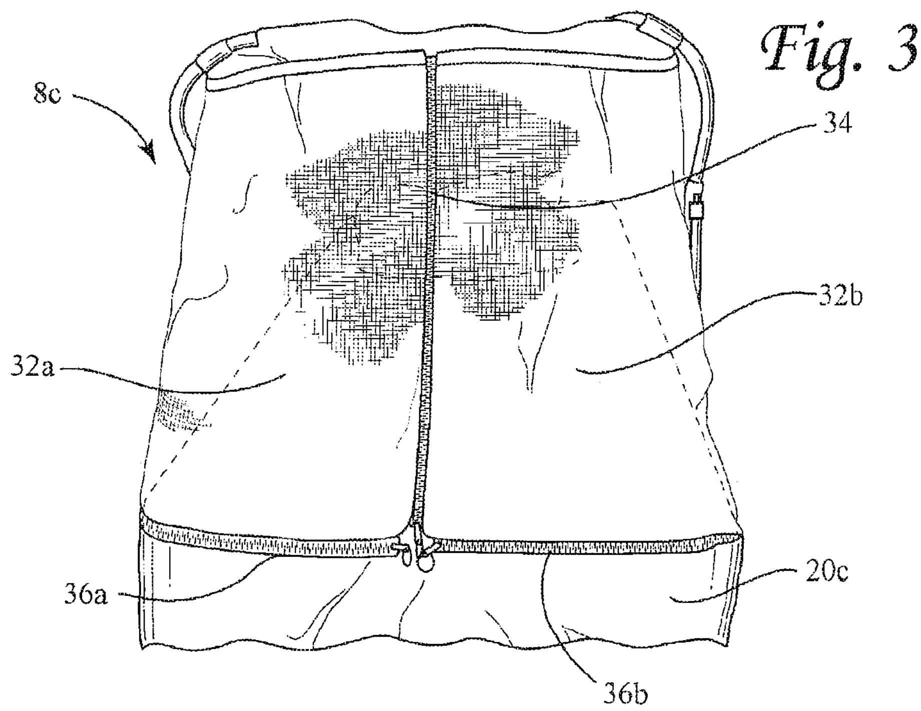
FIG. 3 is an end view of a portable confinement device according to yet another embodiment of the present disclosure.

Referring now to FIG. 3, there is shown yet another portable confinement device 8C according to another embodiment of the present invention.

While each of the embodiments shown in FIGS. 1-3 is of similar general construction, the fastenable openings for entering and leaving the interior of the confinement devices 8A and 8B are, respectively, a downward-opening door panel 26 and an upward-opening door panel 30, while that of confinement device 8C is made up of two flaps 32*a* and 32*b* which fasten together along zipper 34 and fasten along their bottoms to the side 20C by way of zippers 36*a* and 36*b*.

Figure 4:
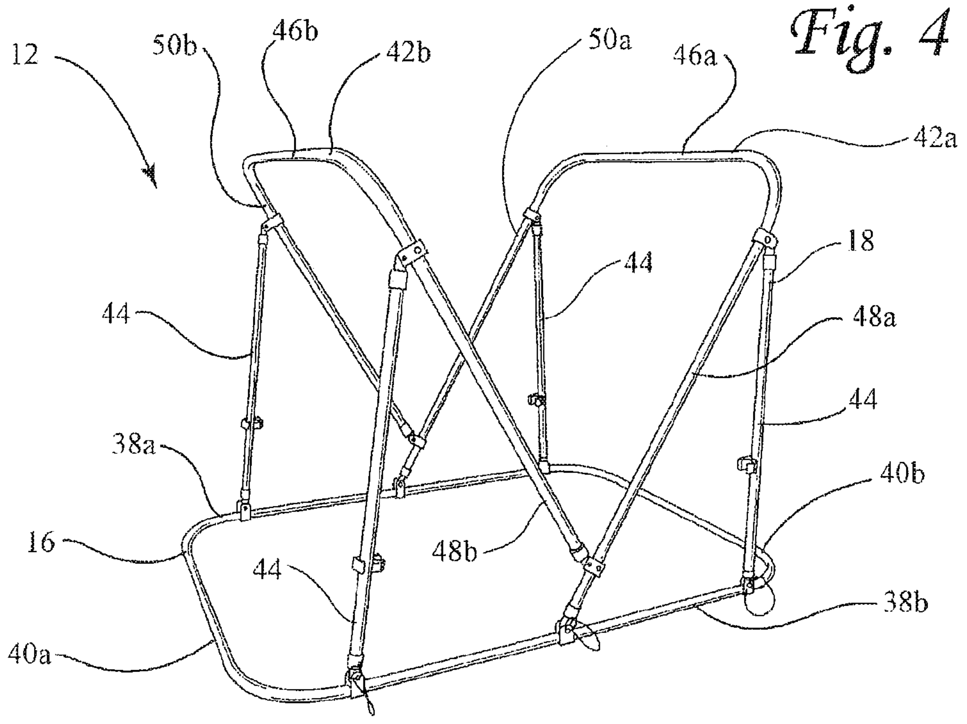
FIG. 4 is a perspective view of the frame of a portable confinement device according to an embodiment of the present disclosure.

An embodiment of the frame 12 of the present invention is shown by itself in FIG. 4. The base 16 of the frame 12 has two sides 38*a*, 38*b* which are parallel to one another and set apart at a preselected distance. In this embodiment, the base 16 also includes two additional sides, 40*a*, 40*b*, which interconnect the two sides 38*a*, 38*b*. Some embodiments of the present invention include additional stabilizing elements, e.g., plates or corner cross braces, in the plane of the base to provide additional structural stability to the base or for better overall stability of the confinement device. The upright portion 18 includes two bridge sections, first bridge section 42*a* and second bridge section 42*b*, and four supports 44. The first bridge section 42*a* has a center section 46*a* from which depend two legs 48*a* and 50*a*. Likewise, the second bridge section 42*b* has a center section 46*b* from which depend two legs 48*b* and 50*b*.

The frame components described in the previous paragraph may be solid or hollow rods or bars of any cross-sectional shape. Preferably, they are tubes of circular cross-sectional shape. They may be made of plastic, metal, composite, or any other material that provides the requisite structural properties. Preferably, they are constructed to provide a combination of low weight and good structural strength to the frame 12. In some preferred embodiments, these frame components are steel or aluminum tubes.

The upright portion 18 is attached to the base 16 in the following manner. Referring still to FIG. 4, it can be seen that each of the terminal ends of the legs 48*a*, 50*a* of the first bridge section 42*a* attaches to one or the other of base sides 38*a*, 38*b*. It can also be seen that each of the terminal ends of the legs 48*b*, 50*b* of the second bridge section 42*b* attach to one or the other of the legs 48*a*, 50*a* of the first bridge section 42*a* so as to form a vee. It is preferred that the location of this attachment be selected so that the attachment point is the apex of an inverted isosceles triangle which has the intersecting leas, e.g., legs 48*a* and 48*b*, as its sides of equal length and an imaginary line connecting the distal ends of those leas as its base. FIG. 4 also shows that one end of each of the supports 44 attaches to a leg of one of the first and second bridge sections 42*a*, 42*b* and the other end of each of the supports attaches to one or the other of base sides 38*a*, 38*b*. Preferably, one or more of the attachments described in this paragraph is non-permanent. However, it is also within the contemplation of the present invention that any or all of the attachments described in this paragraph be permanently made.

Figure 5:
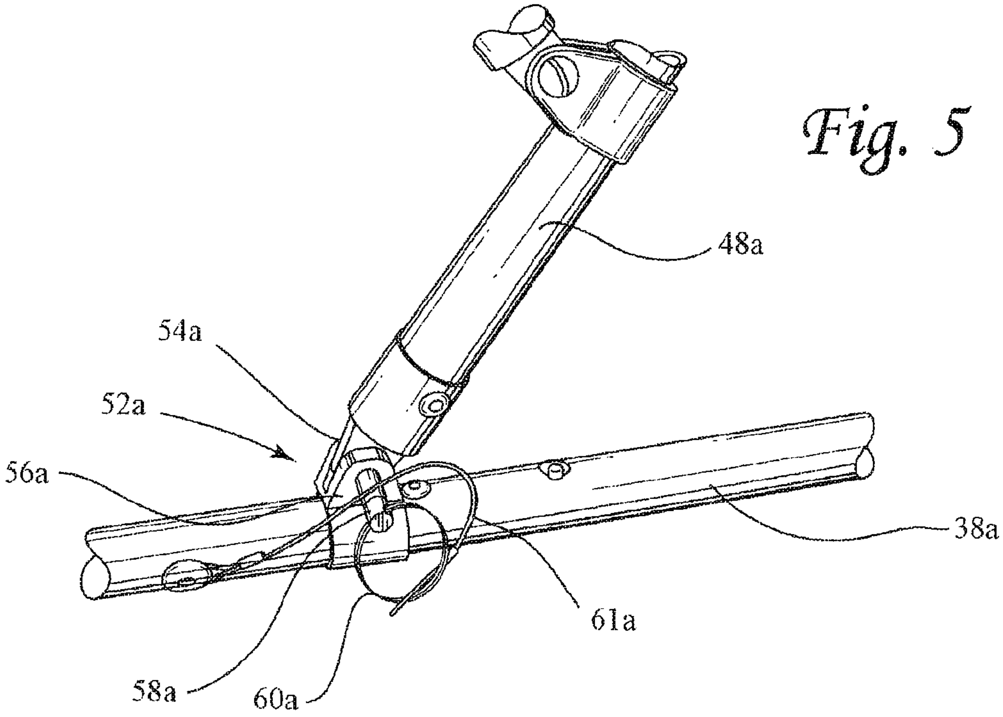
FIG. 5 is a perspective side view of one of the points of attachment of the first bridge section to a base side and of the second bridge section to the first bridge section according to an embodiment of the present disclosure.
Figure 6:
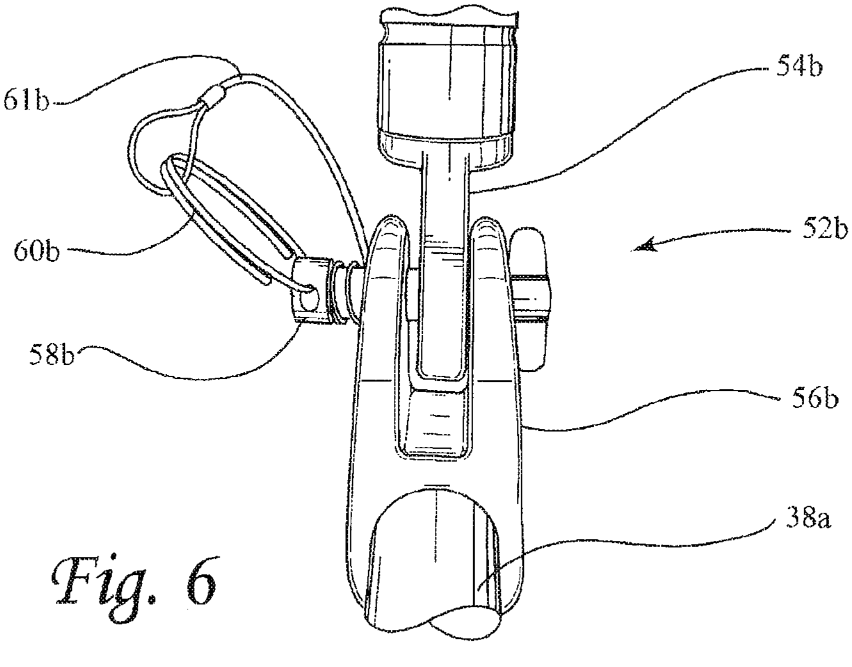
FIG. 6 is a front view of the point of attachment of a support to a base side of the frame according to an embodiment of the present disclosure.

Any means of attachment known to persons skilled in the art may be used to make the attachments described in the previous paragraph. Preferred means of attachment are illustrated in FIGS. 5 and 6. Referring now to FIG. 5, there is shown the attachment of the terminal end of leg 48*a* to base side 38*a* by means of an eye-and-pin connector system, e.g. connector system 52*a*. The connector system 52*a* includes an eye end 54*a* which is pinned to a receiving jaw 56*a* by a spring-loaded toggle pin 58*a*. The eye end 54*a* is riveted to the terminal end of leg 48*a*, and the receiving jaw 56*a* is riveted to the base side 38*a*. The toggle pin 58*a* is preferably tethered by way of a connecting ring 60*a* and a small ligature 61*a* to the base side 38*a* to prevent loss of the toggle pin 58*a* when it is not in use. FIG. 6 shows the use of a similar eye-and-pin connector system 52*b* having an eye end 54*b* pinned to receiving jaw 56*b* by a spring-loaded toggle pin 58*b*. The toggle pin 58*b* is preferably tethered by way of connecting ring 60*b* and a small ligature 61*b* to the base side 38*a*. The connector system 52*b* differs from the connector system 52*a* mainly in materials construction, as some portions of the connector system 52*b* are plastic while all of the portions of connector system 52*a* are steel.

Referring again to FIG. 1, at some point during the assembly of the portable enclosure device 8A, the enclosure 14 is made to be supported by the frame 12. Although any means known to persons skilled in the art of arranging such support is within the contemplation of the present invention, it is preferred that the support be provided by attaching the enclosure 14 to the frame 12. It is even more preferred that the enclosure 14 be removably attached to the frame 12. Preferably, only the top of the enclosure 14 is attached to the frame 12, but in some embodiments of the present invention, the sides 14 and/or the bottom of the enclosure 14 are also be attached to the frame 12. Although any means of attachment known to a person skilled in the art may be used to attach the enclosure 14 to the frame 12, it is preferred to make the attachment by providing the enclosure 14 with a plurality of pockets 62A which are adapted to encircle portions of the frame 12. The pockets 62A shown in this embodiment are all of about the same length and comprise a flap 64 that has one end sewn to the roof 22 or a side 20 of the enclosure 14 and a small strap 66 that is located the width of the pocket away from the sewn end of the flap 64. The ends of the strap 66 are sewn to the roof 22 or a side 20 of the enclosure 14 so that the free end of the flap 64 may be passed under and around the strap 66 after it has been passed over a portion of the frame 12. The flap 64 has a hook section and a corresponding loop section attached to one of its sides so that they can fasten together to secure a portion of the frame 12 in the pocket 62A formed by the flap 64 passing under and around the strap 66.

Referring now to FIG. 2, there is shown another arrangement for attaching the enclosure 14 to the frame 12. In this embodiment, only two pockets 62B are used. Each of the pockets 62B encircles the entire center section of one or the other of the first and second bridge sections 68*a*, 68*b* of the frame 70. Each of the pockets 62B is formed by a flap, e.g., flap 72, that has one end sewn to the roof 74 and sides 76 of the enclosure 78. A zipper 80 is used to fasten the free end of the flap 72 to the roof 74 and the sides 76 to enclose the center section of one of the bridge sections, e.g., the first bridge section 68, within the pocket 62B.

Figure 7:
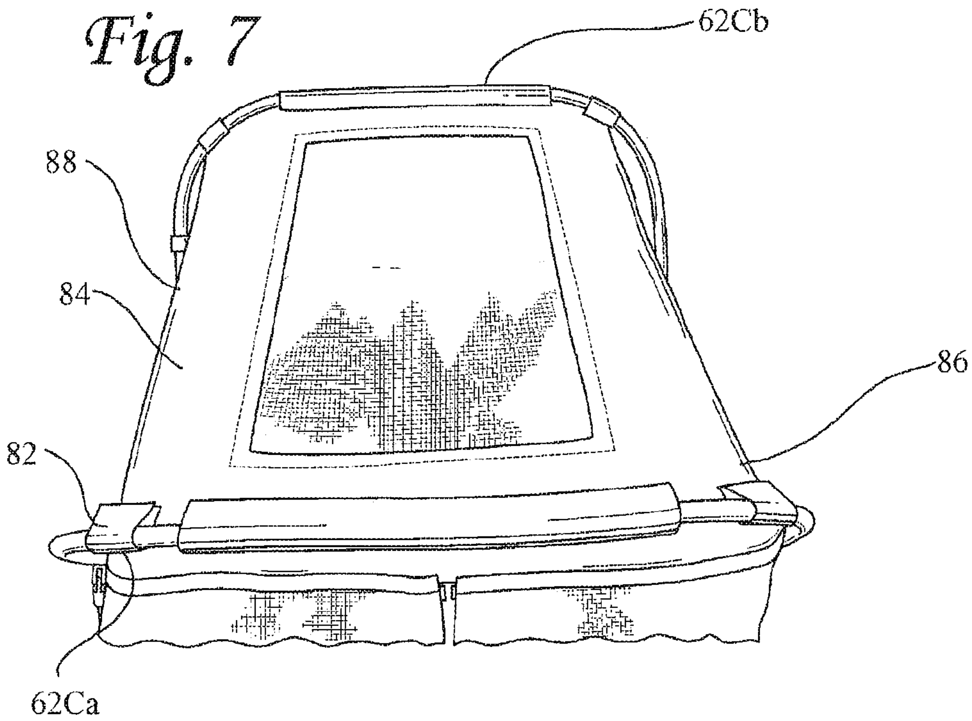
FIG. 7 is a perspective top view of the embodiment of the present disclosure shown in FIG. 3 and illustrates a window in the roof of the enclosure.

Referring now to FIG. 7, there is shown yet another arrangement for attaching the enclosure to the frame. FIG. 7 shows the top of the embodiment of the present invention that is shown in FIG. 3. In this embodiment, four short pockets 62Ca and two long pockets 62Cb are used. Each of the pockets 62Ca, 62Cb is formed by a flap, e.g., flap 82, that has one end sewn to the roof 84 or one of the sides 86 of the enclosure 88. A hook-and-loop fastener is used to fasten the free end of the flap 82 to the roof 84 or to one of the sides 86 of the enclosure 88 to enclose a portion of the frame within the pocket, e.g., pocket 62Ca.

Referring again to FIG. 1, the flexible enclosure 14 is constructed of strong, durable materials so that it is effective in confining a person and can be used daily for weeks, months, or even years. Any suitable materials known to persons skilled in the art may be used for making the enclosure 14. The materials are preferably fire retardant. Particularly preferred materials are a black vinyl encapsulated polyester mesh with a 30 percent openness factor for the mesh windows 24 and canvas for the non-mesh portions 25.

Likewise, the fasteners for the enclosure 14 are to be strong, durable, and easy to use. Zippers and hook-and-loop fasteners are particularly preferred, but any fasteners known to persons skilled in the art may be used, including ligatures. Some types of fasteners are appropriate for some uses but not others, depending on the accessibility of the fastener to a person inside the enclosure. For example, zippers, hook-and-loop fasteners, sewn loops or pockets, buttons, snaps, and ligatures may all be used for attaching the enclosure 14 to the frame 12, whereas of this group of fasteners, only the zippers, hook-and-loop fasteners, and ligatures are preferred for use with the opening for a person's entry and exit 26 and the opening for mattress insertion 28. Particularly preferred zippers have teeth made of acetyl resin, e.g., Delrin®, and tapes made of polyester. One such preferred zipper is the Vision® VFUVIK107DX #10 chain zipper available from the YKK Corporation of Tokyo, Japan.

Figure 8:
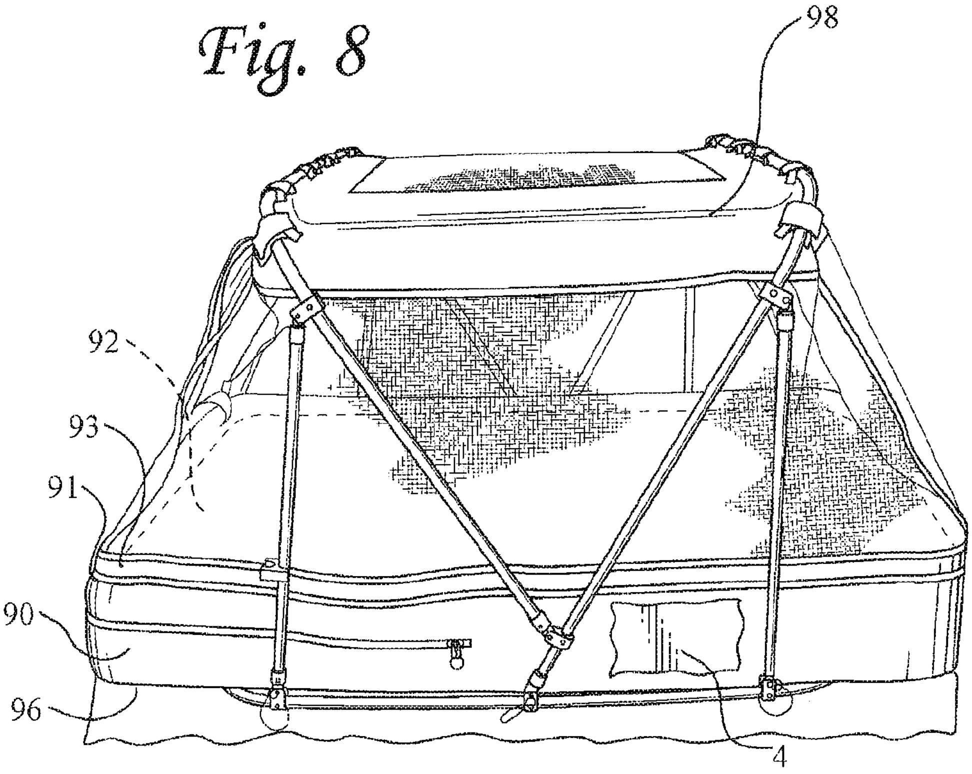
FIG. 8 is a perspective partial cutaway side view of a portable confinement device according to an embodiment of the present disclosure wherein the enclosure has a mattress pocket.

The present invention contemplates the use of the inventive portable enclosure device with a mattress upon which the confined person may sleep, rest, relax, or play. It is contemplated that any type of mattress known to persons skilled in the art may be used with the present invention. Some of the embodiments of the present invention include a mattress, while other embodiments do not, and the mattress may be separately supplied. All of the embodiments of the present invention are adapted to receive a mattress. Referring again to FIG. 1, the mattress 4 may be received into the interior space 6 of the enclosure 14 either by way of the opening 26 that is otherwise used for entry and exit of a person or by way of an opening 28 that is specially provided for inserting or withdrawing the mattress 4. Referring now to FIG. 8, the mattress 4 may also be received into a mattress pocket 90 (portion of the enclosure 14 that is below seam 91) that is defined by the underside of the floor 92 (attached to the sides 93 at seam 91), the lower portions of the sides 94, and the bottom 96 of the enclosure 98. The mattress pocket 90 prevents a confined person from burrowing under the mattress 4 and possibly getting trapped there.

Figure 9:
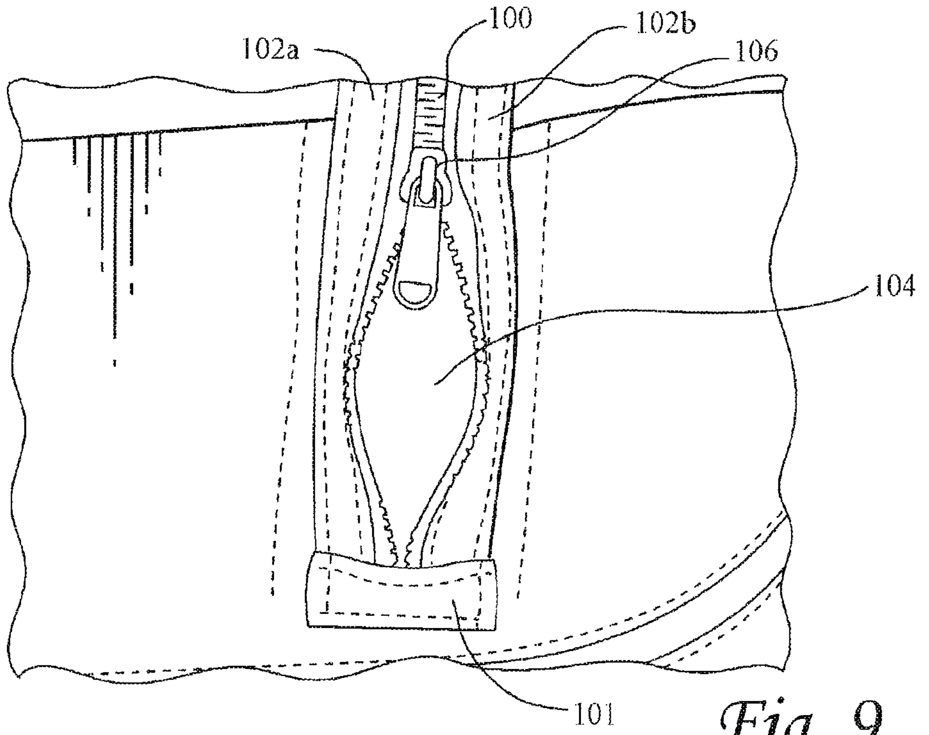
FIG. 9 is a detail of a front view of the embodiment of the present disclosure shown in FIG. 2 and illustrates the end of a zipper fastener arranged to allow opening only from outside of the enclosure.
Figure 10:
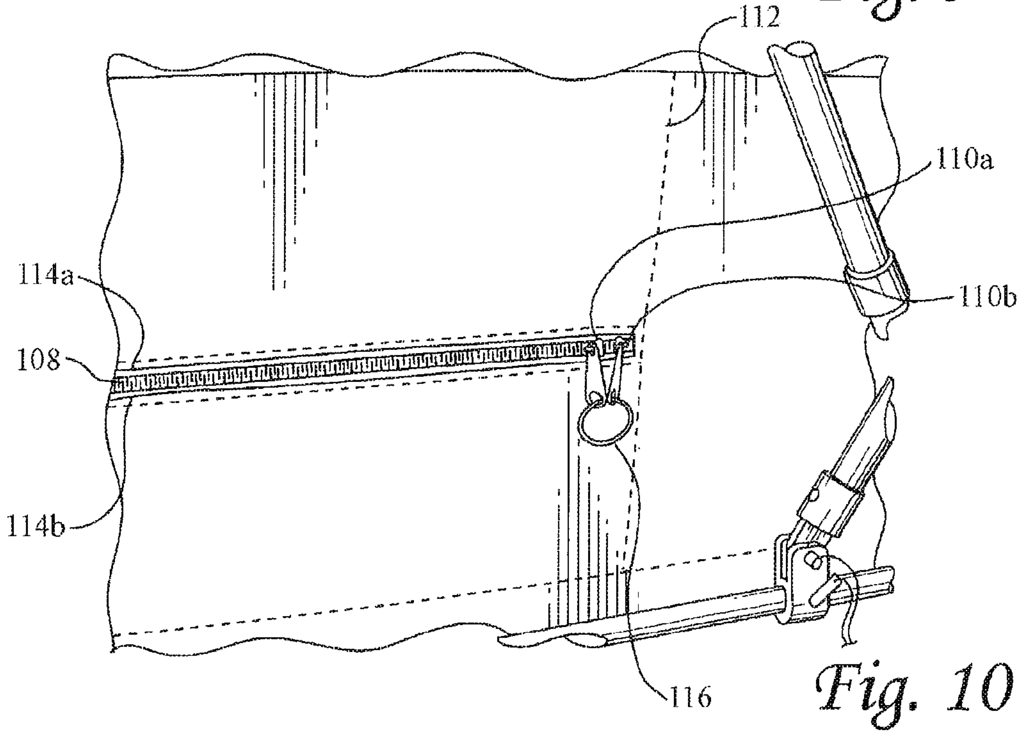
FIG. 10 is a detail of a perspective side view of the embodiment of the present disclosure shown in FIG. 2 and illustrates a means of locking the mattress opening so that it may be opened only from outside of the enclosure.

An important feature of the present invention is that the fastenings for any opening through which a person may exit the enclosure are unfastenable only from outside the enclosure. Any means or combination of means known to those skilled in the art may be used to provide this feature. Two examples are shown in FIGS. 9 and 10 for preventing a zipper fastener from being opened from inside the enclosure. Referring to FIG. 9, where a single-slide zipper 100 is used, a fabric strip 101 is sewn in place between the ends of the zipper tapes 102*a*, 102*b* and across the zipper stop (hidden by the fabric strip) to prevent the end of the zipper 100 from pulling apart, and a backing 104 is provided for more than a finger's length of the zipper 100 from the stop so that a person inside the enclosure cannot reach the zipper slide 106 when it is parked against the stop. FIG. 10 shows a zipper 108 having two slides 110*a*, 110*b*. Here, a seam 112 is sewn between the ends of the zipper tapes 114*a*, 114*b* and across the zipper stop to prevent the end of the zipper 108 from pulling apart, and a locking ring 116 is used to lock together the two zipper slides 110*a*, 110*b*.

Figure 11:
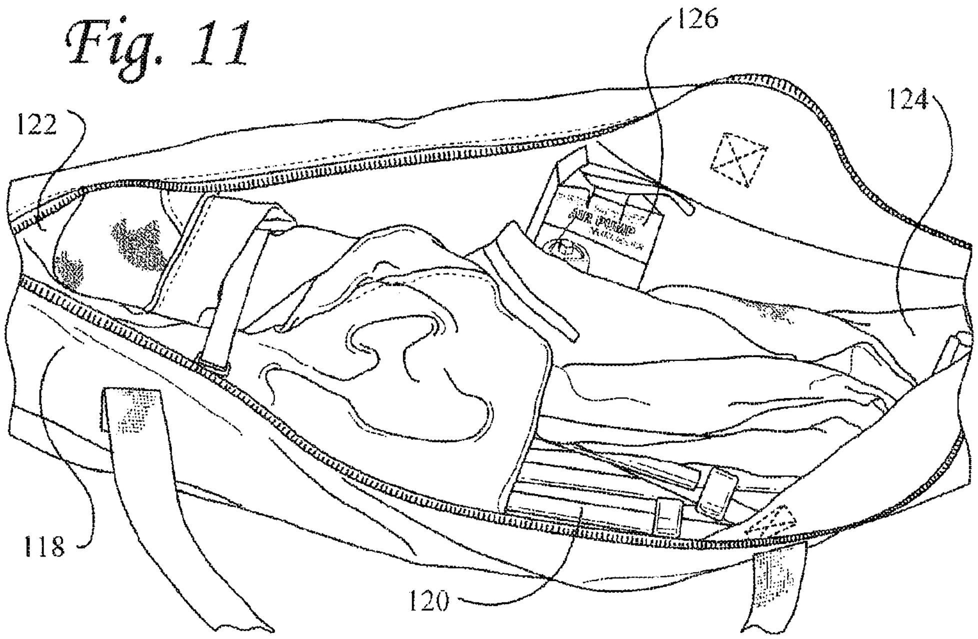
FIG. 11 is a perspective view of an open carrying bag containing a frame, enclosure, inflatable mattress, and optional air pump according to an embodiment of the present disclosure.

Some embodiments of the present invention include a carrying bag to transport and store the portable confinement device. Referring now to FIG. 11, there is shown a carrying bag 118 opened to show its contents. The contents consist of the various parts of a disassembled confinement device, i.e., components of the frame 120, a flexible enclosure 122, and an inflatable mattress 124, along with an air pump 126 for inflating the mattress 124.

Figure 12:
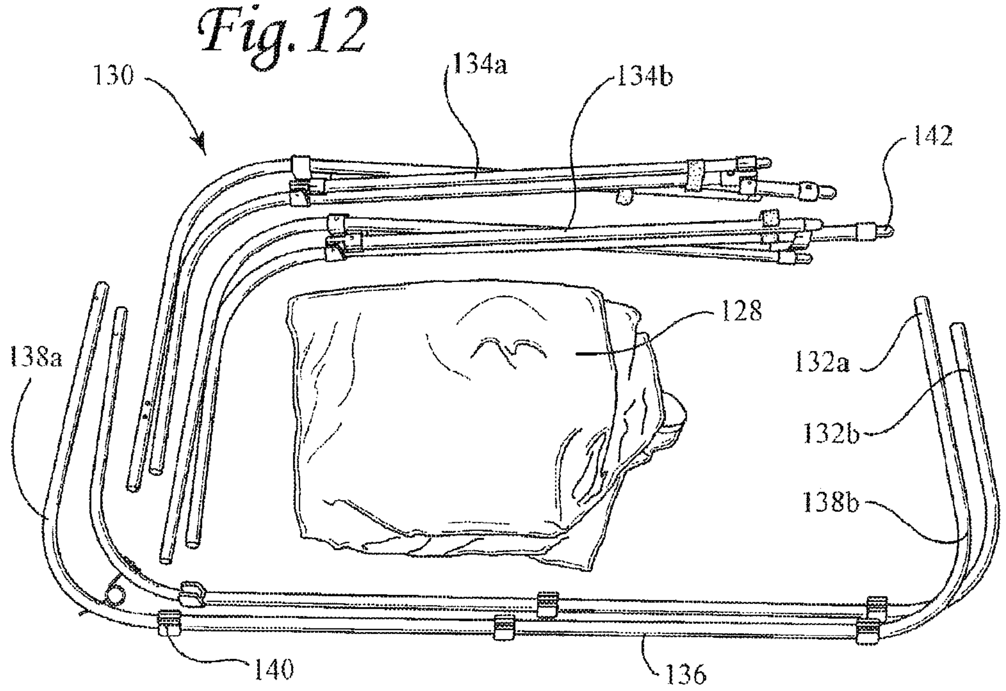
FIG. 12 is a perspective view of a disassembled portable confinement device according to an embodiment of the present disclosure.

Referring now to FIGS. 12 and 13, there is shown a preferred embodiment of the present invention having features to enhance portability and ease of assembly. Referring now to FIG. 12, there is shown the folded-up enclosure 128 and the frame components 130 of a disassembled portable confinement device. The frame components 130 include two base sections 132*a*, 132*b* and two upright sections 134*a*, 134*b*. Each of the frame components 130 comprises a hollow steel tube. Each of the two base sections 132*a*, 132*b* comprises a midsection, e.g., midsection 136, and two legs 138*a*, 138*b*. The midsection 136 corresponds to one or the other of the base sides 38*a*, 38*b* shown in FIG. 4. The ends of the of the two base sections 132*a*, 132*b* fit and lock together in cylindrical butt-lap joints having push-button locks. Jaws of eye-and-pin connector systems, e.g., jaw 140, are fixed onto each of the base sections 132*a*, 132*b* for receiving corresponding eye ends of the upright sections 134*a*, 134*b*, e.g., eye end 142. Each of the upright sections 134*a*, 134*b* gangs together two supports and two half sections of a bridge section, which are divided at about the midpoints of their center sections. The corresponding sides of the bridge sections fit and lock together in cylindrical butt-lap joints having push-button locks.

FIG. 13 shows the frame 130 in a partially assembled state. The two base sections 132*a*, 132*b* are joined together, as are the two upright sections 134*a*, 134*b*. The ends of the first bridge section 136 are attached to one or the other of the base sides 138*a*, 138*b*. The upright section 134*a* in the foreground shows the manner in which its various components are ganged together using pivotable, fixed-pin, eye-and-pin joints 146*a*, 146*b*, 146*c*. Snap-lock brackets 148*a*, 148*b* are used to keep adjacent tubular sections together during handling and storage.

The portable confinement devices of the present invention may be sized to fit any size of mattress. The height of headroom provided above the mattress top is preferably approximately the width of the mattress to help guard against the confined person's movements tipping over the device, but may vary from this to provide sufficient room for a person to comfortably move about. It is also preferred that the interior space be large enough to comfortably accommodate the confined person 150 and the person's caregiver 152, as illustrated in FIG. 14.

Figure 15:
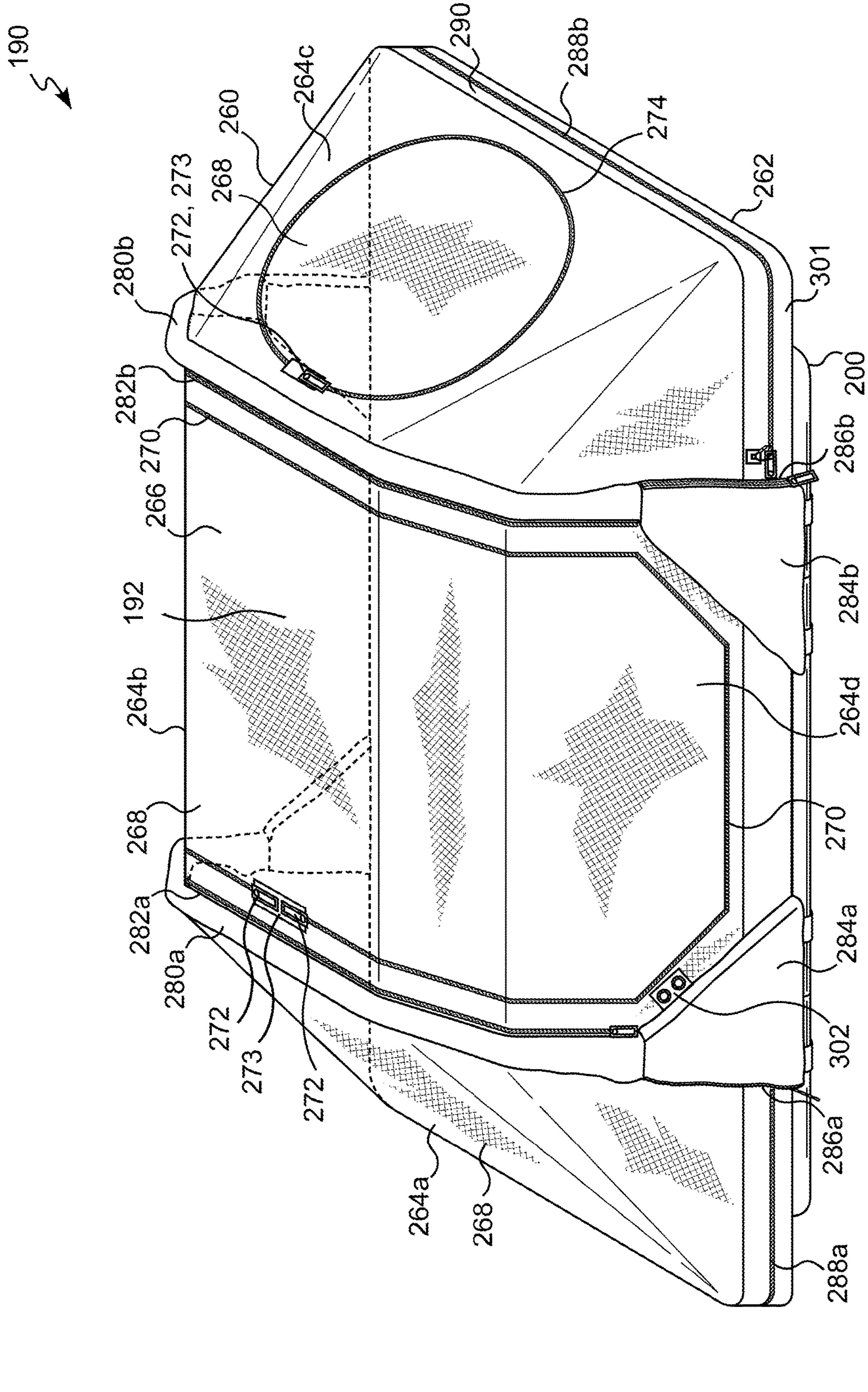
FIG. 15 is a perspective view of a portable confinement device according to another embodiment of the present disclosure.
Figure 26:
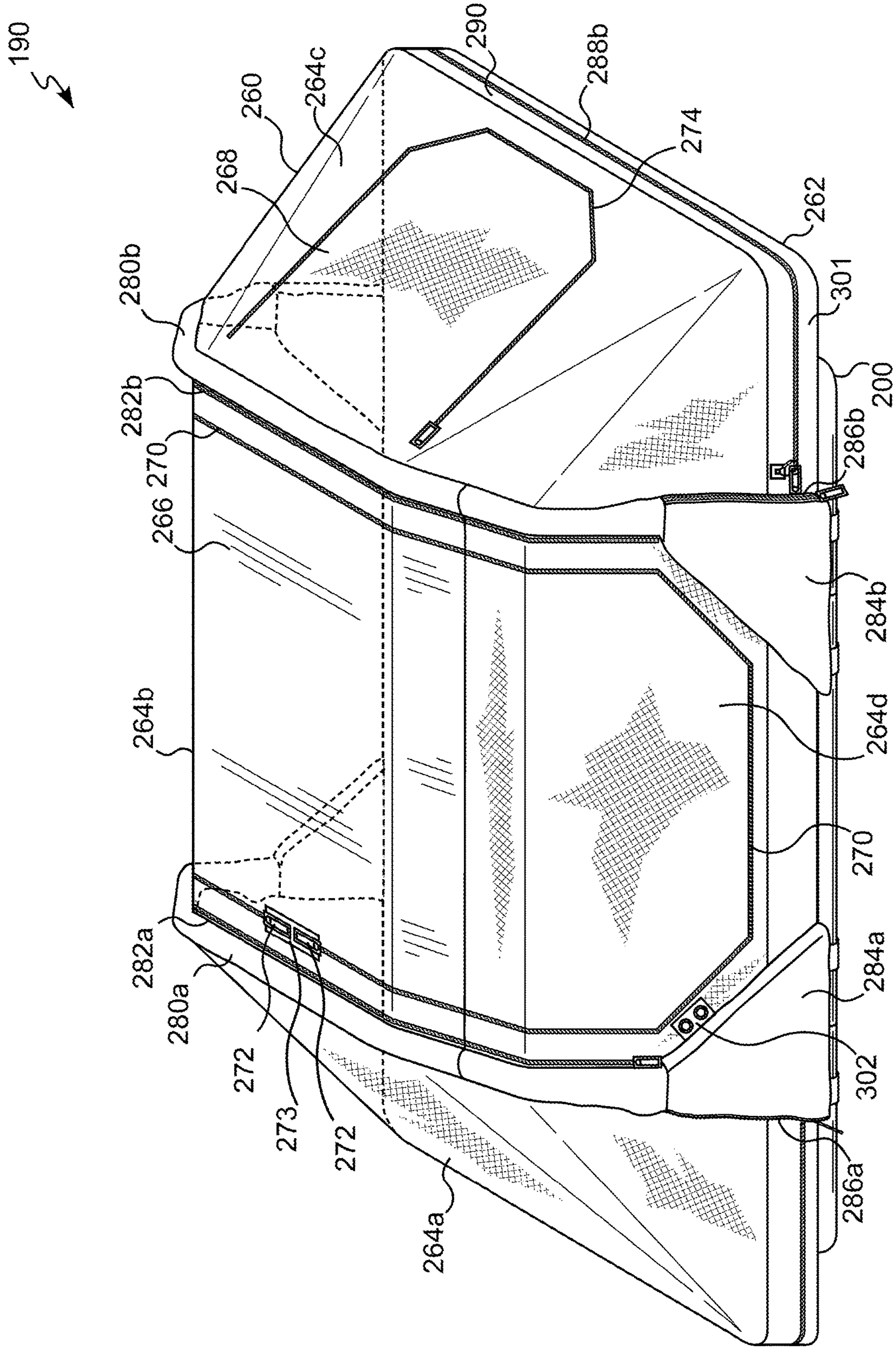
FIG. 26 is a perspective view of a portable confinement device according to another embodiment of the present disclosure.
Figure 27:
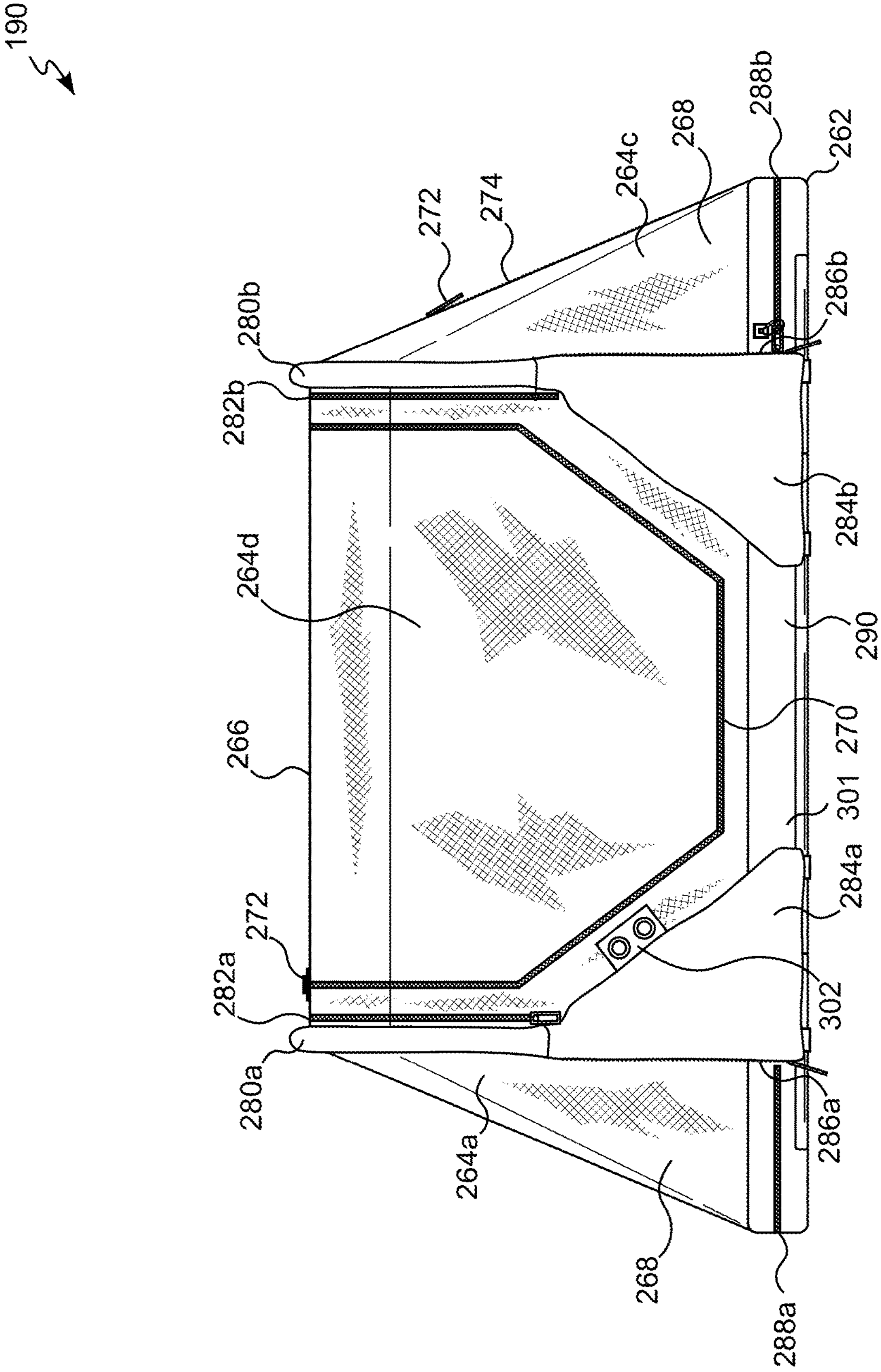
FIG. 27 is a front view of the portable confinement device of FIG. 15.

With reference to FIG. 15, a portable confinement device 190 is shown according to another aspect of the present disclosure. The confinement device 190 has a flexible enclosure 260 supported by a frame 200. The top of the enclosure 266 is generally suspended from upright portions 212*a*, 212*b* of the frame 200, while the bottom of the enclosure 262 rests upon a base member 202 of the frame 200 in order to stabilize the confinement device 190, to prevent it from tipping over, and to allow the confinement device 190 to take the various shapes shown in FIGS. 15 and 26-38. The precise structure of the support frame 200 and how the confinement device is supported thereon will be discussed in more detail below. The enclosure 260 has four sides 264*a*, 264*b*, 264*c*, 264*d* and a roof 266, all or some of which may have mesh windows 268 to provide ventilation and light to an interior space 192. As shown in FIG. 26, the roof 266 is a solid material such as canvas, while the four sides 264*a*, 264*b*, 264*c*, 264*d* are mesh. When the enclosure 260 and support frame 200 are arranged as described herein, the four sides 264*a*, 264*b*, 264*c*, 264*d* and the roof 266 define the internal space 110 within the enclosure 260. Within this internal space 110, a mattress 290 may be placed for a user of the confinement device 190 to sleep, sit, or play thereon. As will be described below, the mattress 290 may be placed into the confinement device 190 by way of a fastenable opening 270 or a mattress fastener 288*a*, 288*b*. Due to the features of the confinement device 190 that will be described in more detail below, a user may use the mattress 290 in different states of exposure relative to the environment outside of the confinement device 190.

Referring now to FIGS. 16-20, the structure of the frame 200 used to support the enclosure 260 will now be described. The frame 200 includes a base member 202 having a first side 204 and a second side 206 which are substantially parallel to each other and set apart at a preselected distance. The base member 202 may also include a third 208 and a fourth 210 side which serve to connect the first side 204 and the second side 206 by spanning the preselected distance. Some embodiments of the present disclosure may include additional stabilizing elements, e.g., plates or corner cross braces, in the plane of the base to provide additional structural stability to the base or for better overall stability of the confinement device.

The frame 200 also includes at least two upright members 212*a*, 212*b*. The upright members 212*a*, 212*b* include first supports 214*a*, 214*b*, second supports 216*a*, 216*b*, and bridge portions 218*a*, 218*b*. The bridge portions 218*a*, 218*b* further include first legs 220*a*, 220*b*, second legs 222*a*, 222*b* and cross members 224*a*, 224*b*. The first supports 214*a*, 214*b* extend upward from the first side 204 of the base member 202, and the second supports 216*a*, 216*b* extend upward from the second side 206. The bridge portions 218*a*, 218*b* serve to connect the first supports 214*a*, 214*b* and second supports 216*a*, 216*b* to each other, while extending across and over the base member 202. The first legs 220*a*, 220*b* of the bridge portions 218*a*, 218*b* are connected to and extend upward from the first supports 214*a*, 214*b*, and the second legs 222*a*, 222*b* are connected to and extend upward from the second supports 216*a*, 216*b*. The connections between the first legs 220*a*, 220*b* and first supports 214*a*, 214*b* and the second legs 222*a*, 222*b* and the second supports 216*a*, 216*b* are made by way of lockable hinges 226, which will be described in more detail below.

The cross members 224*a*, 224*b* may take various shapes as shown in FIGS. 18A-20. While only the cross member 224*a* is shown, it is understood that these figures are illustrative of the shape that the cross member 224*b* takes within the confinement device 190 as well.

Figure 18A:
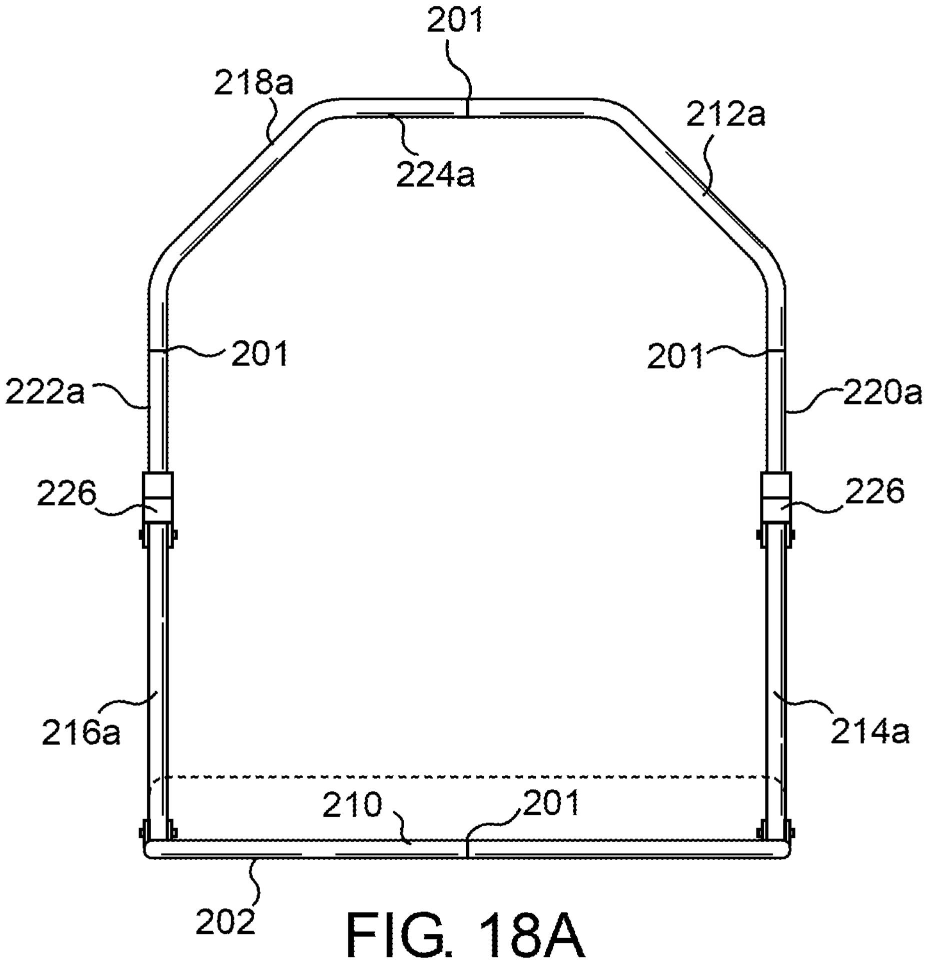
FIG. 18A is a side view of the frame of FIG. 16 in a locked position.

With reference to FIG. 18A, cross member 224*a* may be bent multiple times. It is understood that the cross member 224*a* may be arched, angled, or otherwise have its shape changed when the cross member 224*a* is described as being bent. As shown, the cross member is bent four times as it extends over the base member 202. Each bend in the cross member 224*a* is made at a 45-degree angle until the cross member 224*a* extends from the first leg 220*a* to the second leg 222*a*. This is called a Double 45 design. The 45-degree bends in the cross member 224*a* in the Double 45 design may be made based on an approximately 8-inch radius from the bend to a center point about which the bend is made. It is contemplated that other approximated radii may be used to create the bends in the cross member 224*a* depending on the size of the mattress 290 about which the confinement device 190 is designed. In this configuration, when viewed from the side, as shown in FIG. 18A, the frame 200 takes a hexagonal shape. The hexagonal shape remains when the mattress 290 (identified by the phantom lines in FIG. 18A) is placed within the frame 200.

Figure 19:
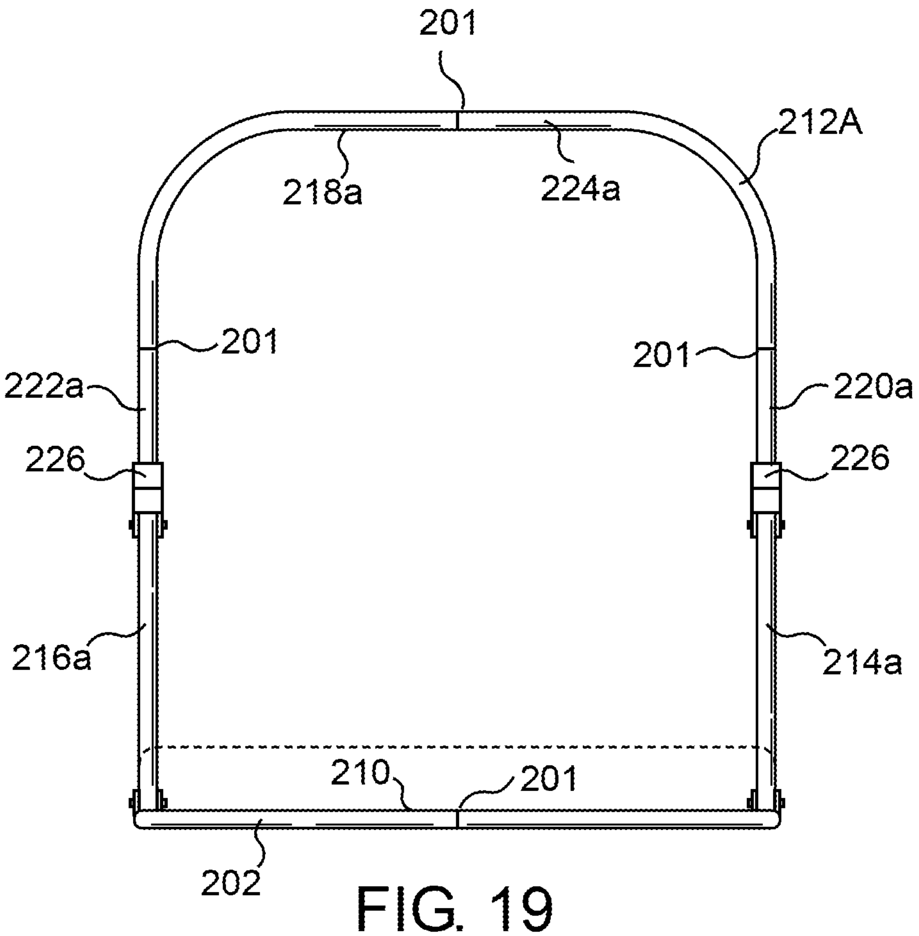
FIG. 19 is a side view of a frame of a portable confinement device according to one embodiment of the present disclosure
Figure 20:
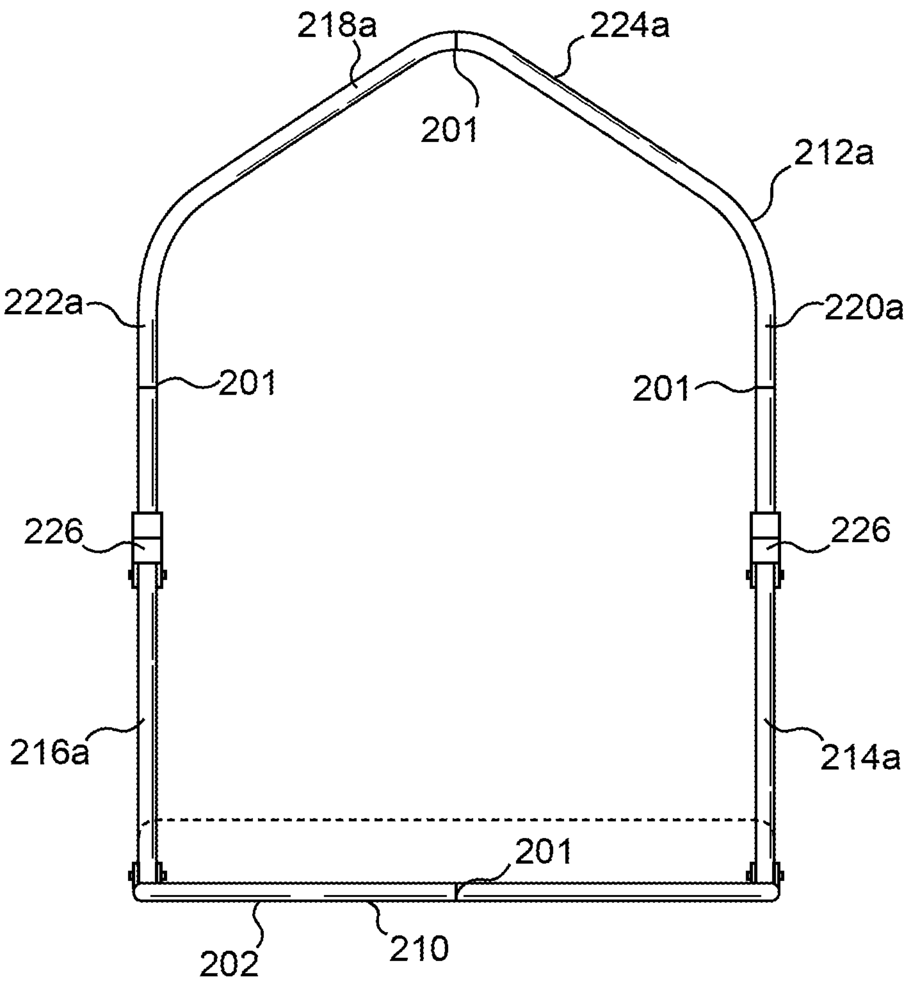
FIG. 20 is a side view of a frame of a portable confinement device according to one embodiment of the present disclosure.
Figure 21A:
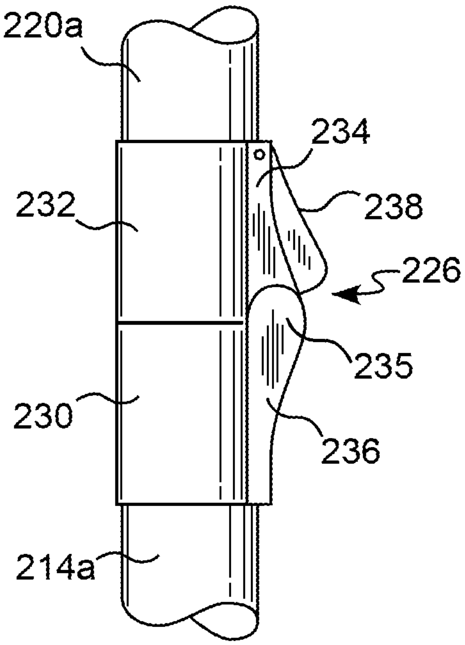
FIG. 21A is a side view of a lockable hinge according to one embodiment of the present disclosure.
Figure 21B:
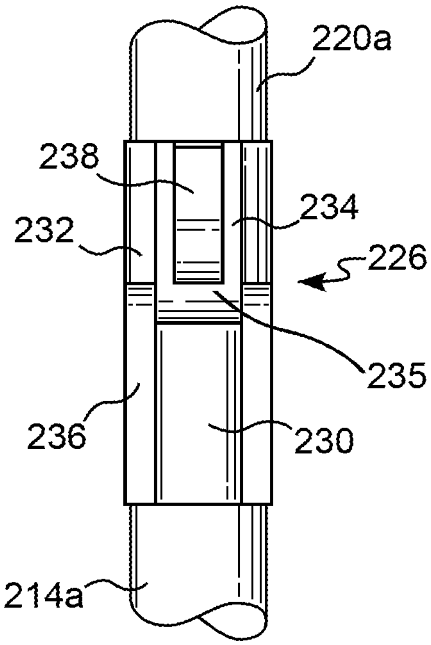
FIG. 21B is a back view of the lockable hinge of FIG. 21A.
Figure 21C:
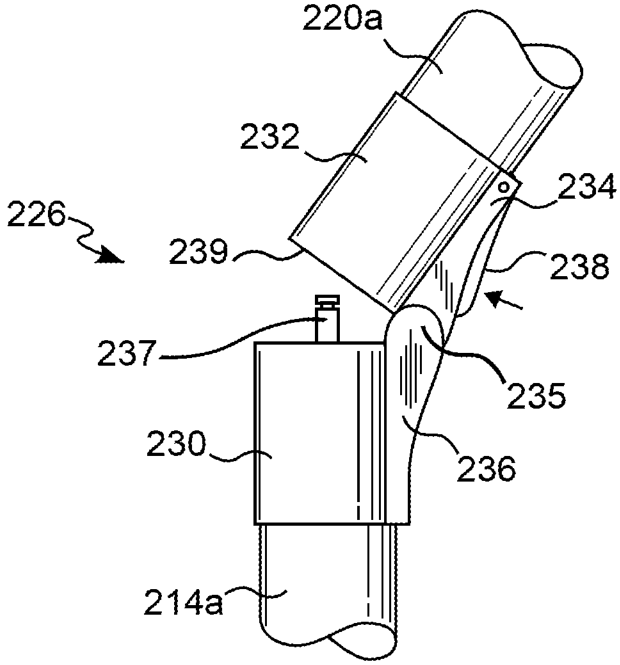
FIG. 21C is a side view of the lockable hinge of FIG. 21A in an unlocked position.

With reference to FIG. 19, the cross member 224*a* may only bend in two locations and extend across the base member 202 in a straight line. In this configuration, when viewed from the side shown in FIG. 19, the frame 200 takes a rectangular shape which remains intact when the mattress 290 is placed within the frame 200. With reference to FIG. 20, the cross member 224*a* may form a point at or near the midpoint of the distance separating the first side 204 and the second side 206 of the base member 202. In this configuration, when viewed form the side shown in FIG. 20, the frame 200 takes a pentagonal shape which remains intact when the mattress 290 is placed within the frame 200.

As shown in FIGS. 16-22C, the first 220*a*, 220*b* and second 222*a*, 222*b* legs are connected to the first 214*a*, 214*b* and second 216*a*, 216*b* supports by lockable hinges 226. With reference to FIGS. 21A-21C, a first embodiment of the lockable hinges 226 is shown. Although the lockable hinge 226 connecting supports 214*a* to leg 220*a* is shown, it is understood that this is illustrative. Each lockable hinge 226 connecting supports 214*b*, 216*a*, 216*b* respectively to legs 220*b*, 222*a*, 222*b* may be identical to that shown in FIGS. 21A-21C.

The lockable hinge 226 has a first portion 230 connected to a terminal end of the first support 214*a* and a second portion 232 connected to a terminal end of the first leg 220*a*. Both the terminal ends of the first support 214*a* and the first leg 220*a* may be received by the respective first 230 and second 232 portions of the lockable hinge 226 therein. The first support 214*a* and the first leg 220*a* may then be riveted to the first 230 and second 232 portions. It is contemplated that the first support 214*a* and the first leg 220*a* may be connected to the first 230 and second 232 portions by other means such as a frictional fit or by screwing the first support 214*a* and first leg 220*a* into their respective portions 230, 232 of the lockable hinge 226.

In order to form the hinge, the first portion 230 of the lockable hinge 226 has a first extension 236 onto which a second extension 234 of the second portion 232 is rotatably mounted. This permits the second portion 232 to rotate about the first portion 230 as a hinge 235. In order to lock the first portion 230 and the second portion 232 together, a locking peg 237 extends from the first portion 230 in the direction of the second portion 232. The second portion has a receiving face 239 configured to receive the locking peg 237 therein. When received, the locking peg 237 locks or sticks within the receiving face 239. The locking peg 237 may be locked within the receiving face 239 by way of a friction fit, snap fit, or other methods known to those having skill in the art. A button 238 is connected to the second extension 234 and, when pressed in the direction identified by the arrow in FIG. 21C, the button 238 causes the receiving face 239 to loosen about the locking peg 237. For example, if the locking peg 237 is snapped into place within the receiving face 239, then by pressing the button 238, the portion of the receiving face 239 into which the locking peg 237 was snapped will release the locking peg 237. In other words, the button 238 is operatively connected to the receiving face 239 in order to facilitate locking and unlocking of the lockable hinge 226. This configuration of the lockable hinge 226 is referred to as a button hinge.

Figure 22A:
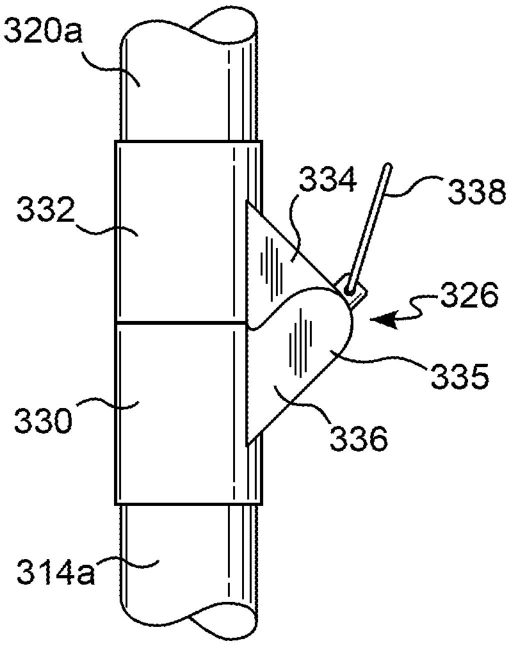
FIG. 22A is a side view of a lockable hinge according to one embodiment of the present disclosure.
Figure 22B:
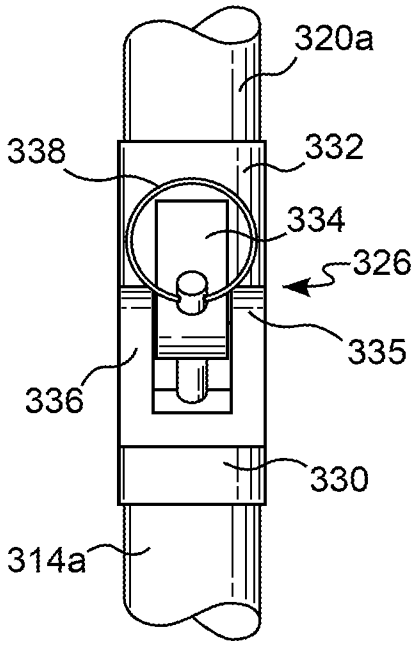
FIG. 22B is a back view of the lockable hinge of FIG. 22A.
Figure 22C:
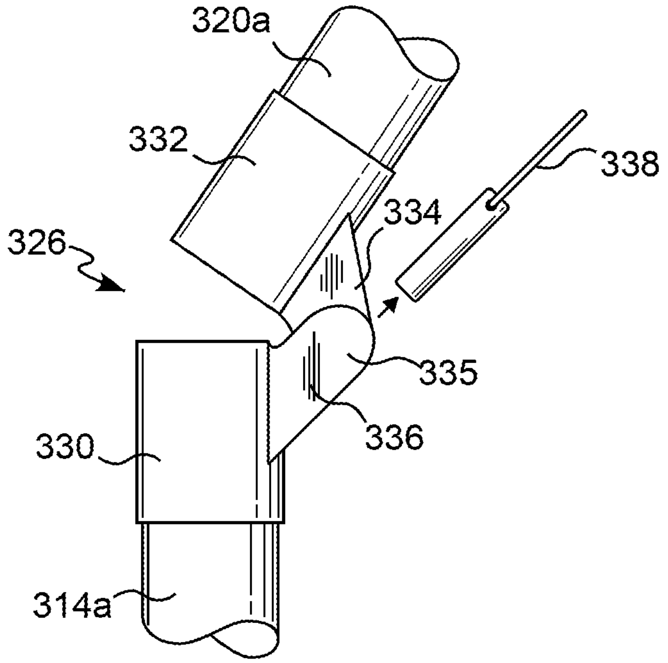
FIG. 22C is a side view of the lockable hinge of FIG. 22A in the unlocked position.

Referring now to FIGS. 22A-22C, a second embodiment of a lockable hinge 326 is shown. Similar to the first embodiment, a first portion 330 of the lockable hinge 326 is connected to a terminal end of the first support 214*a*, and a second portion 332 of the lockable hinge 326 is connected to a terminal end of the first leg 220*a*. Both connections may be identical to those described above with respect to lockable hinge or button hinge 226. Both portions 330, 332 also have respective extensions 336, 334 that cooperate to create a rotatable hinge 335 in the same manner as described above. In this embodiment, the first extension 336 and the second extension 334 have aligning receiving apertures configured to receive a locking pin 338 therethrough. When the locking pin 338 is placed through the receiving apertures, the hinge 326 is locked. When the locking pin 338 is removed from the receiving apertures, the hinge 326 is unlocked.

Figure 17:
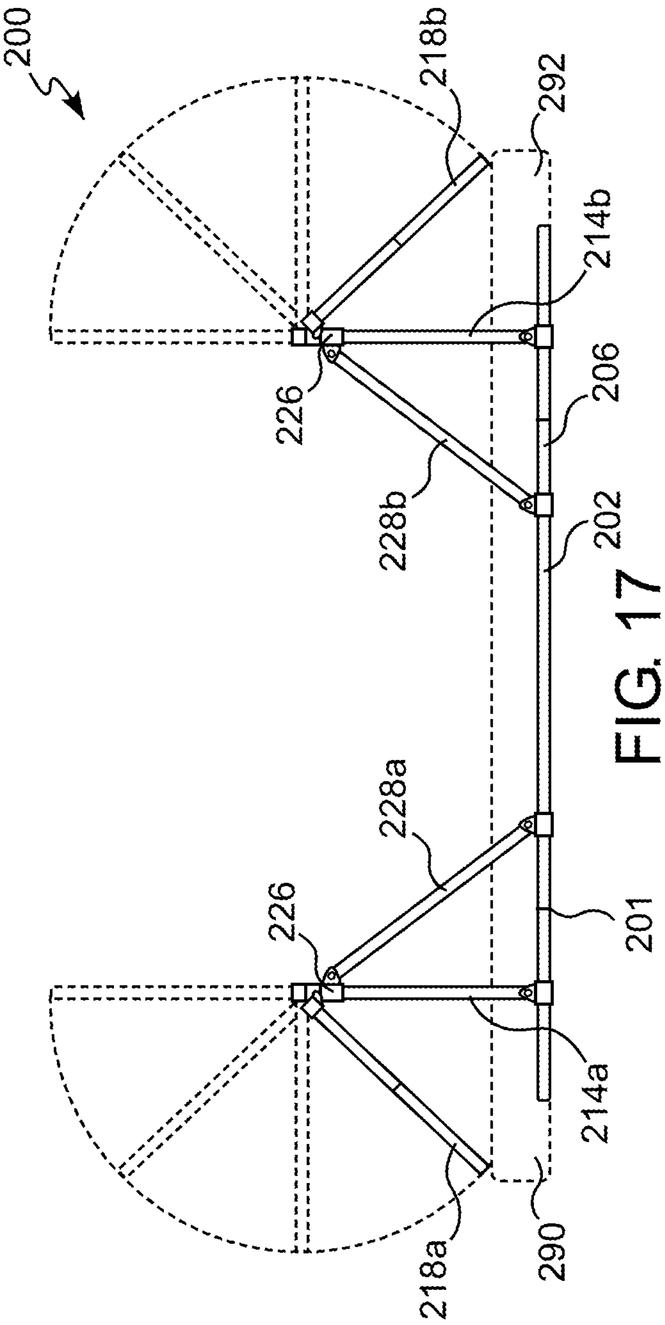
FIG. 17 is a side view of the frame of FIG. 16 movable between a locked and an unlocked position.
Figure 18B:
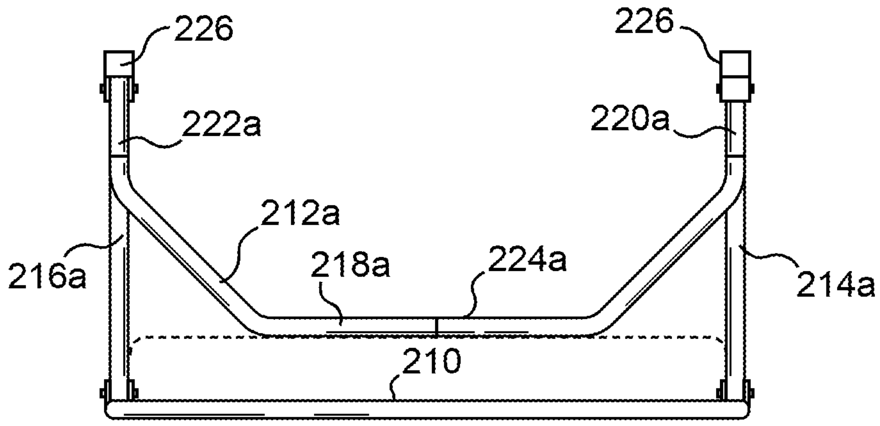
FIG. 18B is a side view of the frame of FIG. 16 in an unlocked position.

When the lockable hinges 226 are locked, the bridge portions 218*a*, 218*b* remain in an upward and locked position, as shown in FIGS. 16, 18A, 19, and 20. When the lockable hinges 226 are unlocked, the bridge portions 218*a*, 218*b* rotate into a downward, lowered position toward a portion of the mattress 290 and/or base 202 of the frame 200 that is located away from a center or midpoint of either element. The movement of the bridge portions 218*a*, 218*b* during unlocking is shown in FIG. 17, which indicates in phantom lines the path of the bridge portions 218*a*, 218*b* as it travels from the upright to the lowered position. A side view of a frame 200 with unlocked lockable hinges 226 is shown in FIG. 18B. Unlocked bridge portions 218*a*, 218*b* will also be shown in figures during the discussion of the enclosure 266. When unlocked, the bridge portions 218*a*, 218*b* may fall against a wall or another support structure (not shown) that may be positioned vertically above the mattress 290 and/or base 202 of the frame 200. The ability for a user to toggle bridge portions 218*a*, 218*b* between the upright position and the downward, lowered position is advantageous for users of the portable confinement device 190, as will be described in more detail below.

Referring back to FIGS. 16 and 17, the frame 200 may also have at least four stabilizing members 228*a*, 228*b*, 228*c*, 228*d*. The stabilizing members 228*a*, 228*b*, 228*c*, 228*d* connect to the sides 204, 206 of the base member 202 and the supports 214*a*, 214*b*, 216*a*, 216*b*, providing additional support to the upright members 212*a*, 212*b*. The stabilizing members 228*a*, 228*b*, 228*c*, 228*d* may connect to the sides 204, 206 at any location, and they may connect to the supports 214*a*, 214*b*, 216*a*, 216*b* at any location below the first portion 230 of the lockable hinge 226. It is contemplated that the stabilizing members 228*a*, 228*b*, 228*c*, 228*d* are capable of connecting to the sides 204, 206 of the base member 202 and the supports 214*a*, 214*b*, 216*a*, 216*b* at different angles in order to provide varying degrees of stability to the supports 214*a*, 214*b*, 216*a*, 216*b*. For example, the stabilizing members 228*a*, 228*b*, 228*c*, 228*d* are shown making an approximately a 45 degree angle with the sides 204, 206 of the base 202 and the supports 214*a*, 214*b*, 216*a*, 216*b*. These angles can be adjusted so that the stabilizing members 228*a*, 228*b*, 228*c*, 228*d* make approximately a 30 degree angle with the sides 204, 206 and a 60 degree angle with the supports 214*a*, 214*b*, 216*a*, 216*b*, and vice versa.

The frame components described herein may be solid or hollow rods or bars of any cross-sectional shape. Preferably, they are tubes of circular cross-sectional shape. They may be made of plastic, metal, composite, or any other material that provides the requisite structural properties. Preferably, they are constructed to provide a combination of low weight and good structural strength to the frame 200. In some embodiments, these frame components are steel or aluminum tubes.

Any means of attachment known to persons skilled in the art may be used to make the attachments between the first 214*a*, 214*b* and second 216*a*, 216*b* supports of the upright portions 212*a*, 212*b* and the first 204 and second 206 sides of the base member 202 described above. Any means of attachment known to persons skilled in the art may also be used to make the attachments between the stabilizing members 228*a*, 228*b*, 228*c*, 228*d* and supports 214*a*, 214*b*, 216*a*, 216*b* as well as the first 204 and second 206 sides of the base member 202 as described above. The preferred means of attachment are the eye-and-pin connector system 240 shown in FIGS. 23A and 23B.

Figure 23A:
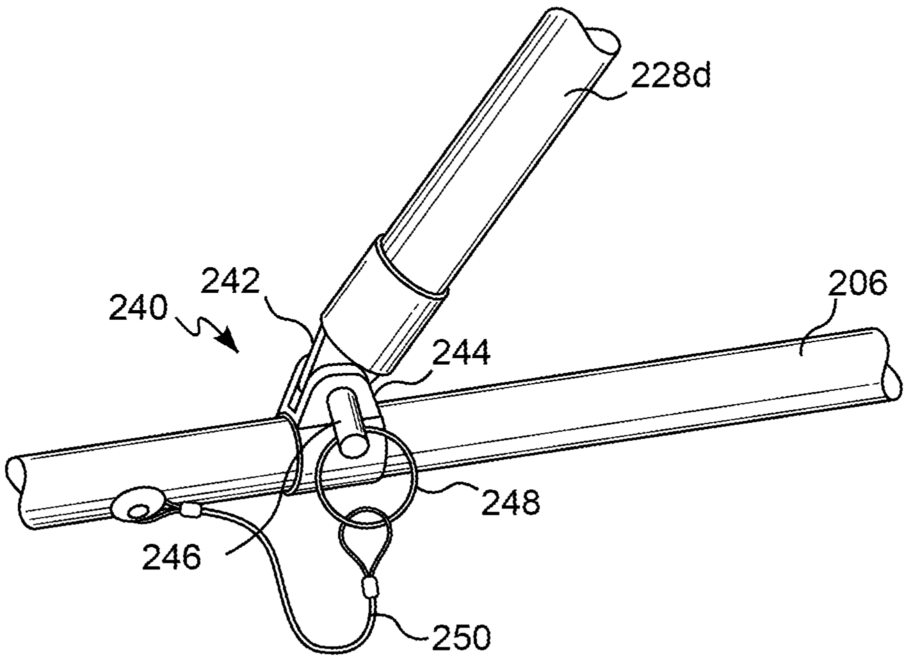
FIG. 23A is a perspective view of an eye-and-key attachment mechanism according to one embodiment of the present disclosure.
Figure 23B:
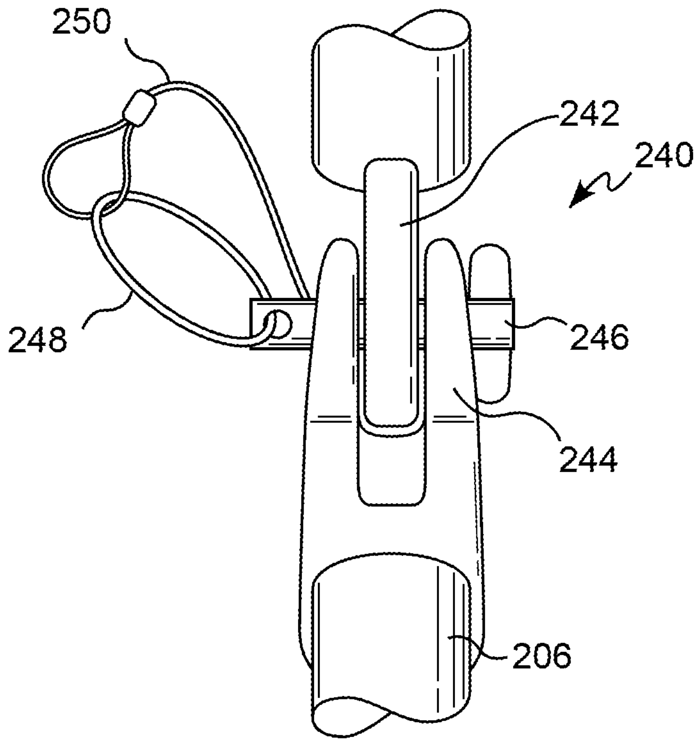
FIG. 23B is a front view of the eye-and-key attachment mechanism of FIG. 23A.

Referring to FIGS. 23A and 23B, there is shown the attachment of a terminal end of support 228*d* to the second side 206 of the base member 202 by means of the eye-and-pin connector 240. While only one attachment is shown, it is understood that this attachment is illustrative of all other eye-and-pin connector 240 attachments. In other words, the attachments between the supports 214*a*, 214*b*, 216*a*, 216*b*, stabilizing members 228*a*, 228*b*, 228*c*, 228*d*, and first side 204 and second side 206 of the base member 202, shown in FIGS. 16, 17, 37A, and 37B, may all made in the same manner.

The connector system 240 includes an eye end 242 which is pinned to a receiving jaw end 244 by a spring-loaded toggle pin 246 that extends through both. The eye end 242 may be riveted to the terminal end of the stabilizing member 228*d*. It is also contemplated that the eye end 242 may receive the terminal end of the stabilizing member 228*d* therein by way of a friction fit or by way of a threaded screw of the terminal end of the stabilizing member 228*d* and a corresponding threaded hole within the eye end 242. The receiving jaw 244 may also be riveted to the side 206 of the base 202, or the receiving jaw 244 may receive the side 206 of the base therein by way of a friction or swaged fit. The toggle pin 246 is preferably tethered by way of a connecting ring 248 and a small ligature 250 to the side 206 of the base 202 to prevent loss of the toggle pin 246 when it is not in use. It is contemplated that the eye-and-pin connector system 240 may be made of various resilient materials such as plastic, steel, or other materials that interact with the materials making up the frame 200.

Figure 24:
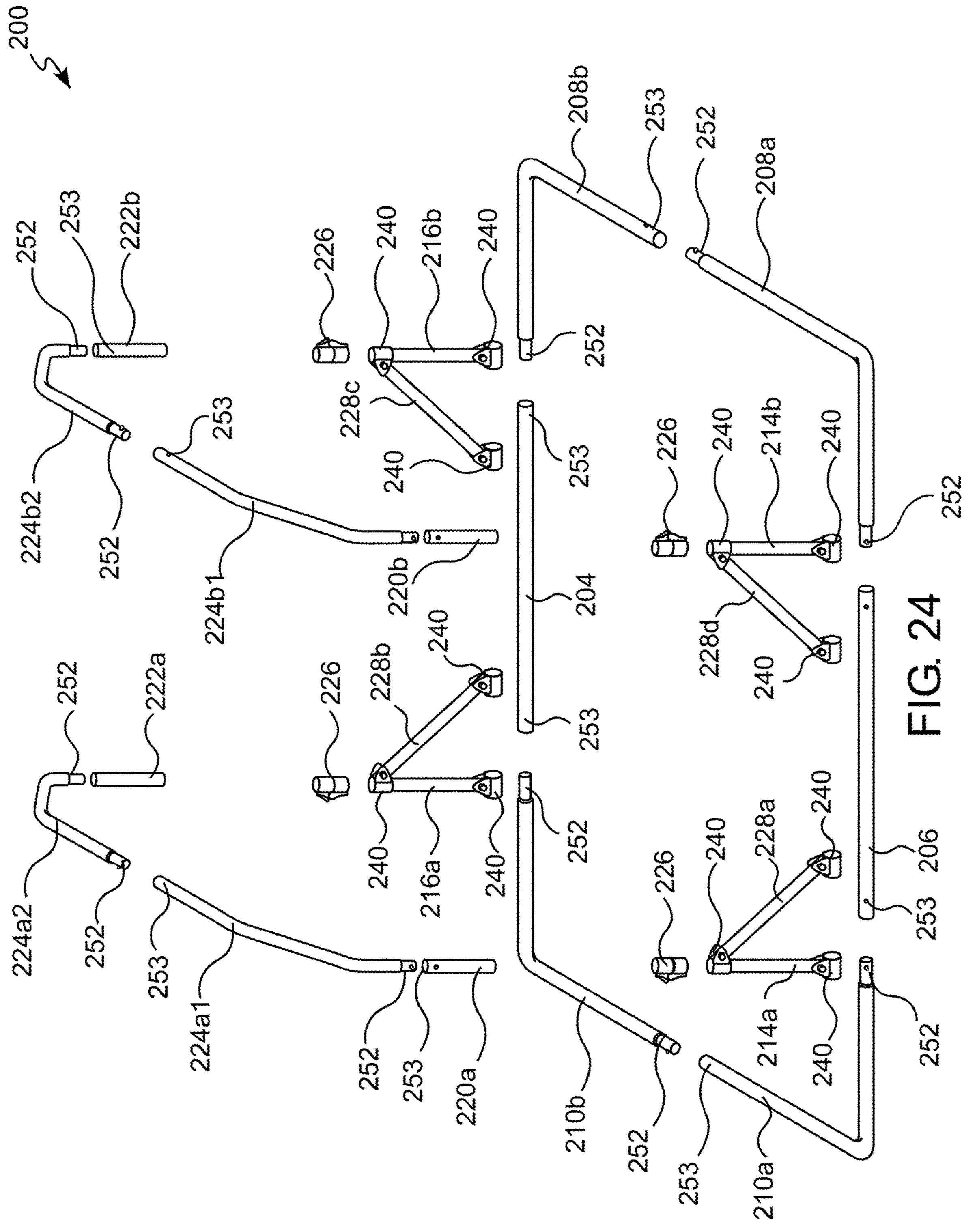
FIG. 24 is an exploded view of the frame of FIG. 16.

In order to provide easy portability of the confinement device 190, the pieces of the frame 200 discussed above may be further made up of other smaller pieces that join together in swaged connections. The swaged connection points 201, shown in FIGS. 16, 17, and 18A-20, indicate where two pieces join together. In FIG. 24, an exploded view of the frame 200 is shown. Comparing FIG. 16 to FIG. 24, the third side 208 of the base 202, the fourth side 210 of the base 202, and the cross members 224*a*, 224*b* of the upright members 212*a*, 212*b* are each made up of two smaller pieces that are swaged together in order to form the larger piece previously described. The third side 208 of the base 202 includes a first half 208*a* and a second half 208*b*. The fourth side 210 of the base 202 includes a first half 210*a* and a second half 210*b*. The first cross member 224*a* includes a first half 224*a*1 and a second half 224*a*2. The second cross member 224*b* includes a first half 224*b*1 and a second half 224*b*2. Each of the respective half pieces fit together to form the larger piece. The swaged connection occurs by fitting one half having a male end 252, for example the first half of third side of the base 208*a*, into the opposing half with a female end 253, the second half of the third side of the base 208*b*. The details of each end of the swaged connections as well as the mechanics thereof will be described in more detail below.

Figure 16:
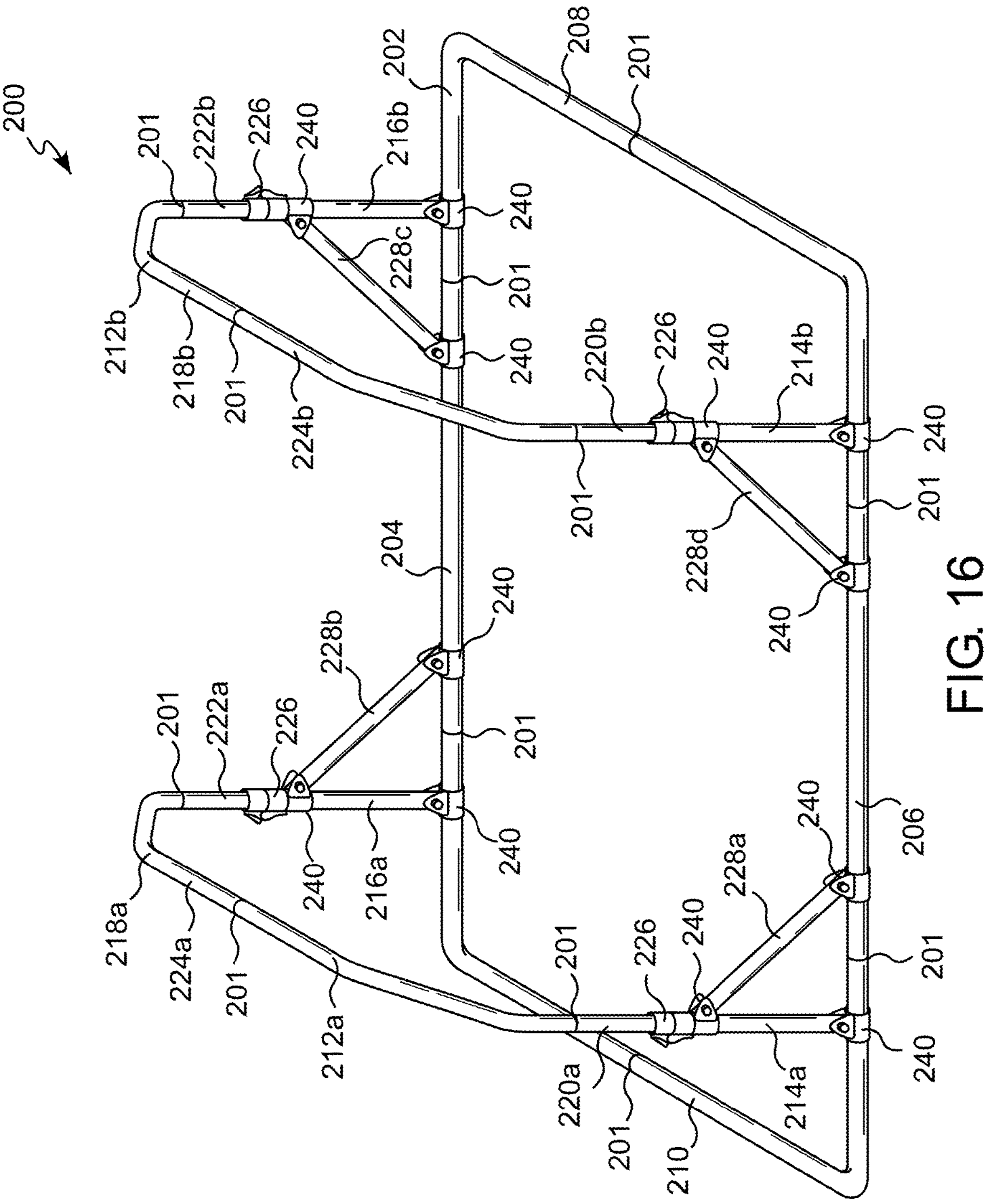
FIG. 16 is a perspective view of a frame according to one embodiment of the present invention.

As is visible in FIGS. 16 and 24, multiple swaged connections are made between different elements of the frame 200, not just those elements previously described. These connections will now be described. Referring to FIG.

24, the connections will be described going around the base member, and then moving upward going from left to right across the frame 200.

The first half of the fourth side 210*a* of the base 202 includes one female end 253 and one male end 252. The male end 252 is received by a first female end 253 on the second side 206 of the base 202. The second side 206 includes a second female end 253 which connects to the second male end 252 on the first half of the third side 208*a*. The connection between the first 208*a* and the second 208*b* halves of the third side 208 of the base 202 is the same as described above. The second half of the third side 208*b* of the base 202 connects to a first female end 253 of the first side 204 of the base 202. A second female end 253 of the first side 204 connects with a first male end 252 of the second half of the fourth side 210*b* of the base 202. A second male end 252 of the second half of the fourth side 210*b* then connects with the female end 253 on the first half of the fourth side 210*a*. The connections between the supports 214*a*, 214*b*, 216*a*, 216*b*, stabilizing members 228*a*, 228*b*, 228*c*, 228*d*, and first side 204 and second side 206 of the base member 202, as discussed above, remain the same.

Working upwardly, the first leg 220*a* of the first bridge member 218*a* extends upward from the lockable hinge 226 having the connection therebetween as described above. A female end 253 on the end opposing the lockable hinge 226 connects with the male end 252 on the first half of the first cross member 224*a*1. A female end on the first half of the first cross member 224*a*1 connects to a first male end 252 on the second half of the first cross member 224*a*2. The second half of the first cross member 224*a*2 also has a second male end 252 that connects to a female end 253 of the second leg 222*a*. The connection between the second leg 222*a* and the lockable hinge 226 is the same as described above.

The connections along the second bridge member 218*b* are similar to the ones just described. The first leg 220*b* extends upward from the lockable hinge 226 having the connection therebetween as discussed above. The first leg 220*b* has a female end that connects to a male end 252 on the first half of the second cross member 224*b*1. The first half of the second cross member 224*b*1 also has a female end 253 that connects to a first male end 252 on the second half of the second cross member 224*b*2. A second male end 252 on the second half of the second cross member 224*b*2 connects to a female end 253 on the second leg 222*b* which connects to the lockable hinge 226 as described above.

Figure 25:
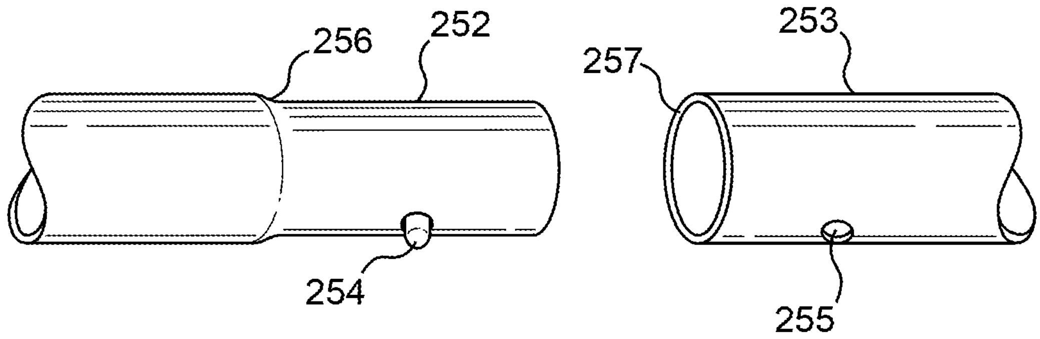
FIG. 25 is a side view of two mating parts of the frame of FIG. 16.

With reference to FIG. 25, the formation of the swaged connections is shown. Each swaged connection is identical to the one shown. A male end 252 is inserted into a female end 253. The male end 252 has a smaller diameter than the female end 253 in order to facilitate proper mating between the pieces. As the male end 252 is inserted into the female end 253, a retractable locking tab 254 on the male end 252 is pushed into the male end 252 by the female end 253. As the male end 252 slides within the female end 253, the locking tab 254 pops out and through a receiving hole 255, locking the male end 252 in place. When the male end 252 is locked in place, an abutting face 257 of the female end 253 is pressed against the swaged portion 256 of the male end 252. This creates a friction fit between the abutting face 257 and the swaged portion 256, thus providing additional security in the mating of the opposing pieces.

With reference to FIGS. 15 and 26-38, the enclosure 260 of the confinement device 100 will now be described in relation to the frame 200. As shown in FIGS. 15 and 26-29, the enclosure 260 is in a closed state where the four sides 264*a*, 264*b*, 264*c*, 264*d* and the roof 266 surround the internal space 110. In this state, a fastenable opening 270 extends around the enclosure 260. The fastenable opening 270 is preferably fastened with a zipper, but fastening means such as hook-and-loop fasteners, buttons, or other means known to those having ordinary skill in the art may be used. When a zipper is used, the zipper has a handle 272 for operation of the fastenable opening 270. The zipper may also have multiple handles 272 in order to facilitate a more efficient opening in opposing directions. The fastenable opening 270 can only be fastened and unfastened when bridge portions 218*a*, 218 (not shown) of the frame 200 are in the upright positions as discussed above. However, when the fastenable opening 270 is unfastened, the bridge portions 218*a*, 218*b* can move between the upright and downward positions by operating the lockable hinges 226.

The fastenable opening 270 extends along one or more of the four sides 264*a*, 264*b*, 264*c*, 264*d* as well as the roof 266. The fastenable opening 270 begins and ends on the roof 266 near one of the bridge portions 218*a*, 218*b* in a central location relative to the second side 264*b* and the fourth side 264*d* of the flexible enclosure 260. As shown, the fastenable opening 270 is nearest the first bridge portion 218*a*, covered by pocket 280*a*, which will be described in more detail below.

The fastenable opening 270 extends along the roof 266 toward the corner made by the roof 266, first side 264*a*, and fourth side 264*d*. The fastenable opening then extends downward and around the fourth side 264*d*. It then continues upward to the corner made by the roof 266, fourth side 264*d*, and third side 264*c*. The fastenable opening 270 continues along the roof 266 until it reaches the corner made by roof 266, the third side 264*c*, and the second side 264*b*. It then extends downward and around the second side 264*b* in a path identical to the path made along the fourth side 264*d*. The fastenable opening 270 then continues upward to the corner made by the roof 266, the first side 264*a*, and the second side 264*b* and continues until it ends near its starting point on the roof 266.

In some instances, it may be desirable to have the fastenable opening 270 only be operable from outside of the enclosure. In these instances, zipper handles 272 may include a strip of Velcro® attached thereto. Then, the zipper handles 272 may attach to a corresponding Velcro® strip 273 on the roof 266 of the enclosure 260. By attaching the zipper handles 272 to the roof 266 by way of the Velcro® strip 273, an individual within the interior 192 of the confinement device 100 cannot access the zipper handles 272 and will remain inside the interior space 192 surrounded by the enclosure 260 when the fastenable opening 270 is closed. Other attachment mechanisms may be used to secure the zipper handles 272 to the roof of the enclosure, such as buttons, clips, or ties. In other instances, it may be desirable to have an individual within the interior 192 be capable of operating the fastenable opening 270. In this case, the zipper handles 272 may rotate so as to be accessible from within the interior space 192, allowing an individual within the interior space 192 to open and close the fastenable opening 270. Additional features to secure the enclosure 260 from the outside and to permit the fastenable opening 270 from opening from within the interior space 192 are discussed in more detail below in connection with FIGS. 38 and 39.

Along with the fastenable opening 270, a side opening 274 may be located on the third side 264*c*, of the enclosure 260, as shown in FIGS. 15 and 26-29. The side opening 274 may also be located on the first side 264*a*. The side opening 264*a* may take a rounded corner square shape about the third side 264*c*, or it may take other shapes, such as that shown in FIG. 12. Like the fastenable opening 270, the side opening 274 may also be a zipper having a zipper handle 272. The zipper handle 272 may also have a Velcro® strip 273 attached thereto in order to attach the zipper handle 272 to a corresponding Velcro® strip 273. This again prevents a person inside the interior space 192 of the confinement device 190 from operating the side opening 274 and exiting the confinement device 190.

Figure 30:
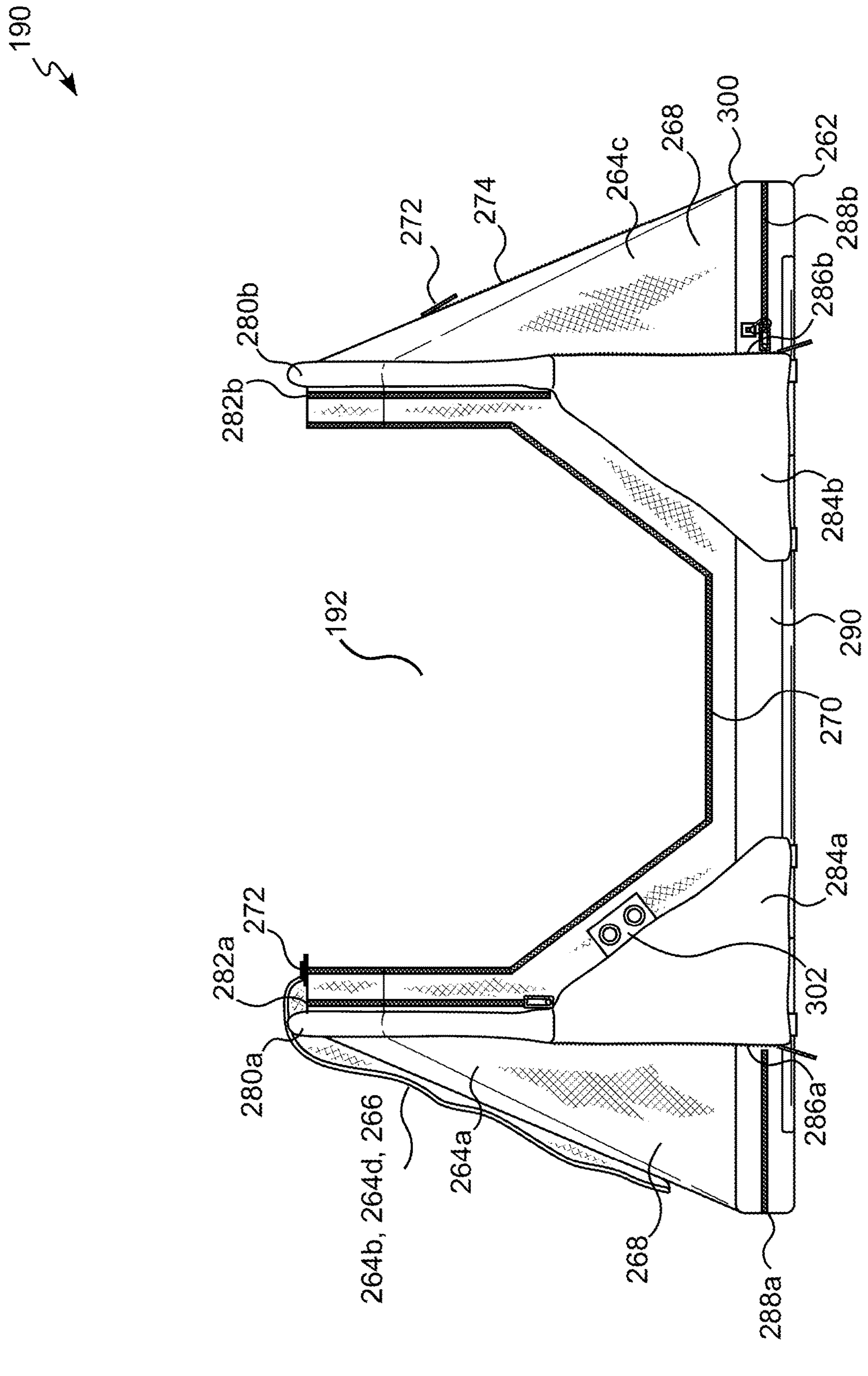
FIG. 30 is a front view of the portable confinement device of FIG. 15 in an open position.
Figure 31:
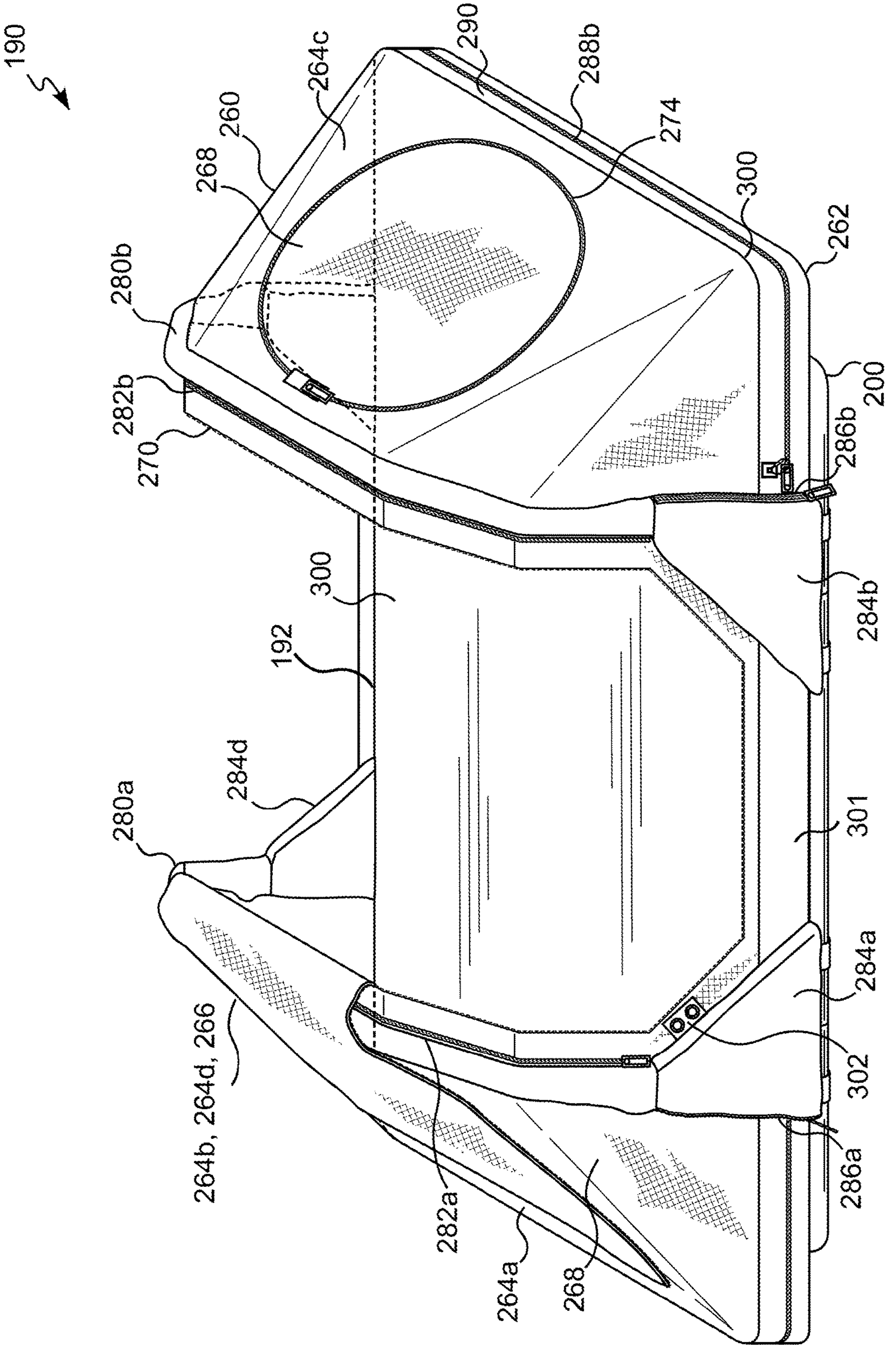
FIG. 31 is a perspective view of the portable confinement device of FIG. 15 in an open position.
Figure 32:
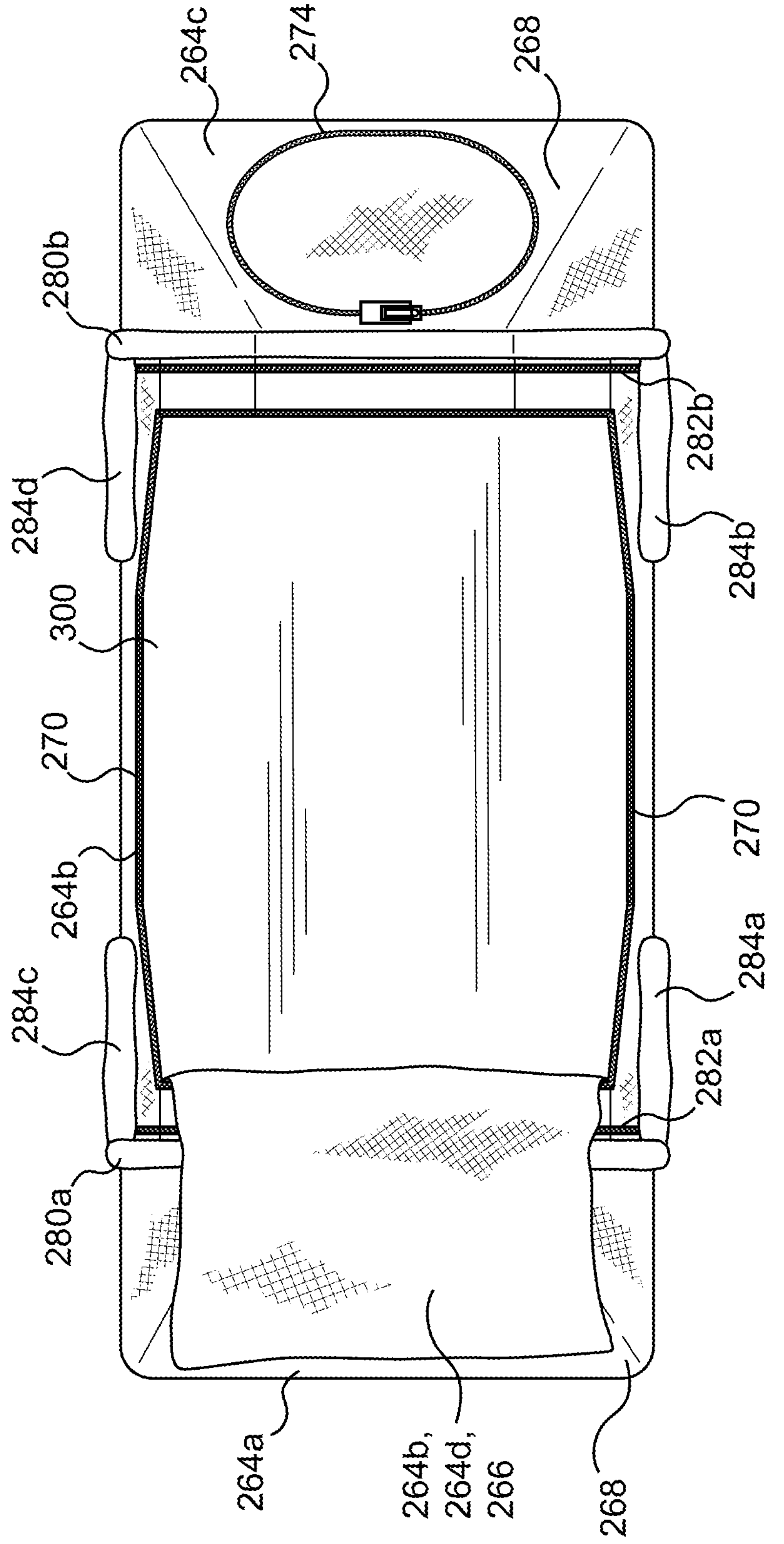
FIG. 32 is a top view of the portable confinement device of FIG. 15 in an open position.
Figure 33:
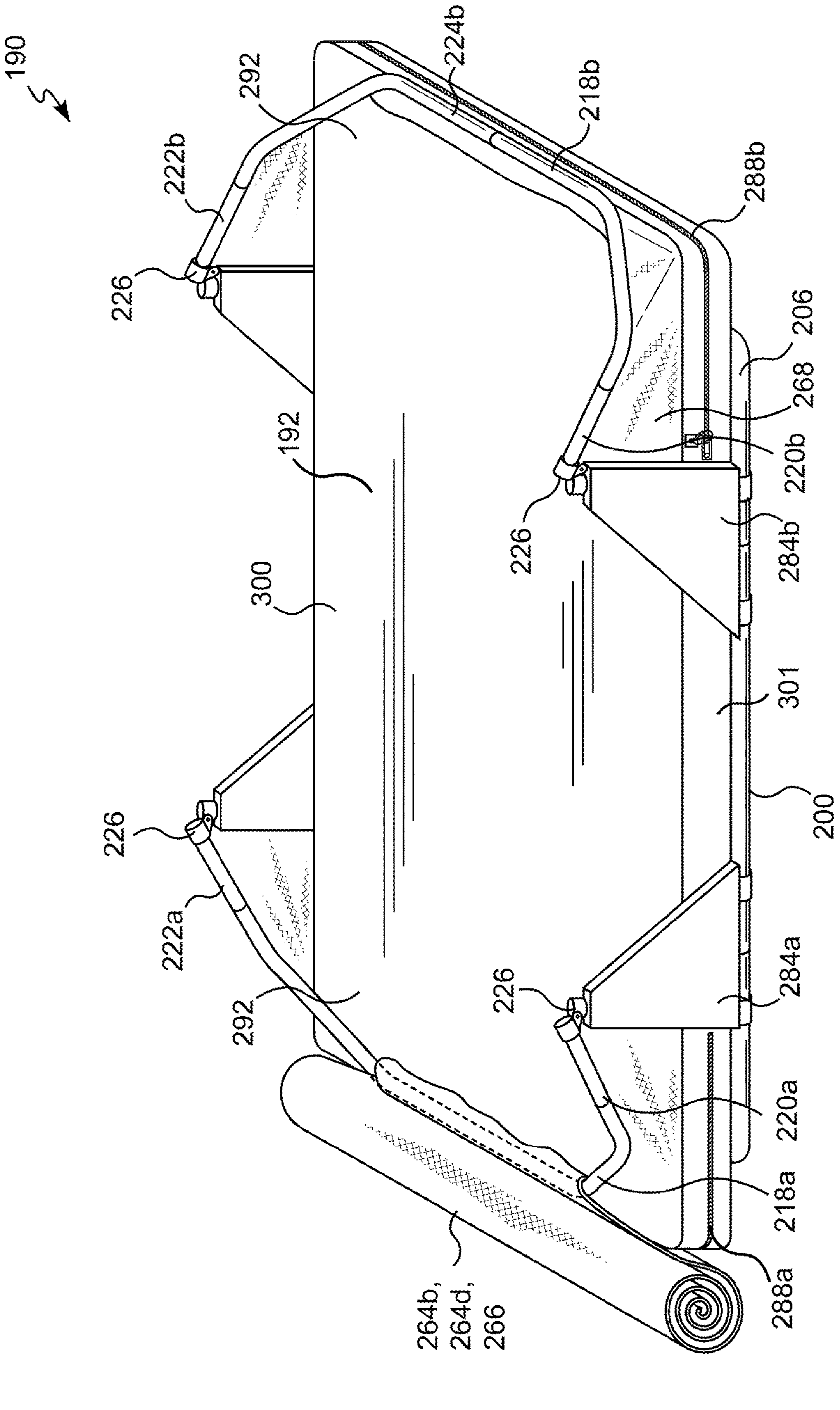
FIG. 33 is a perspective view of the portable confinement device of FIG. 15 in the unhinged position.
Figure 34:
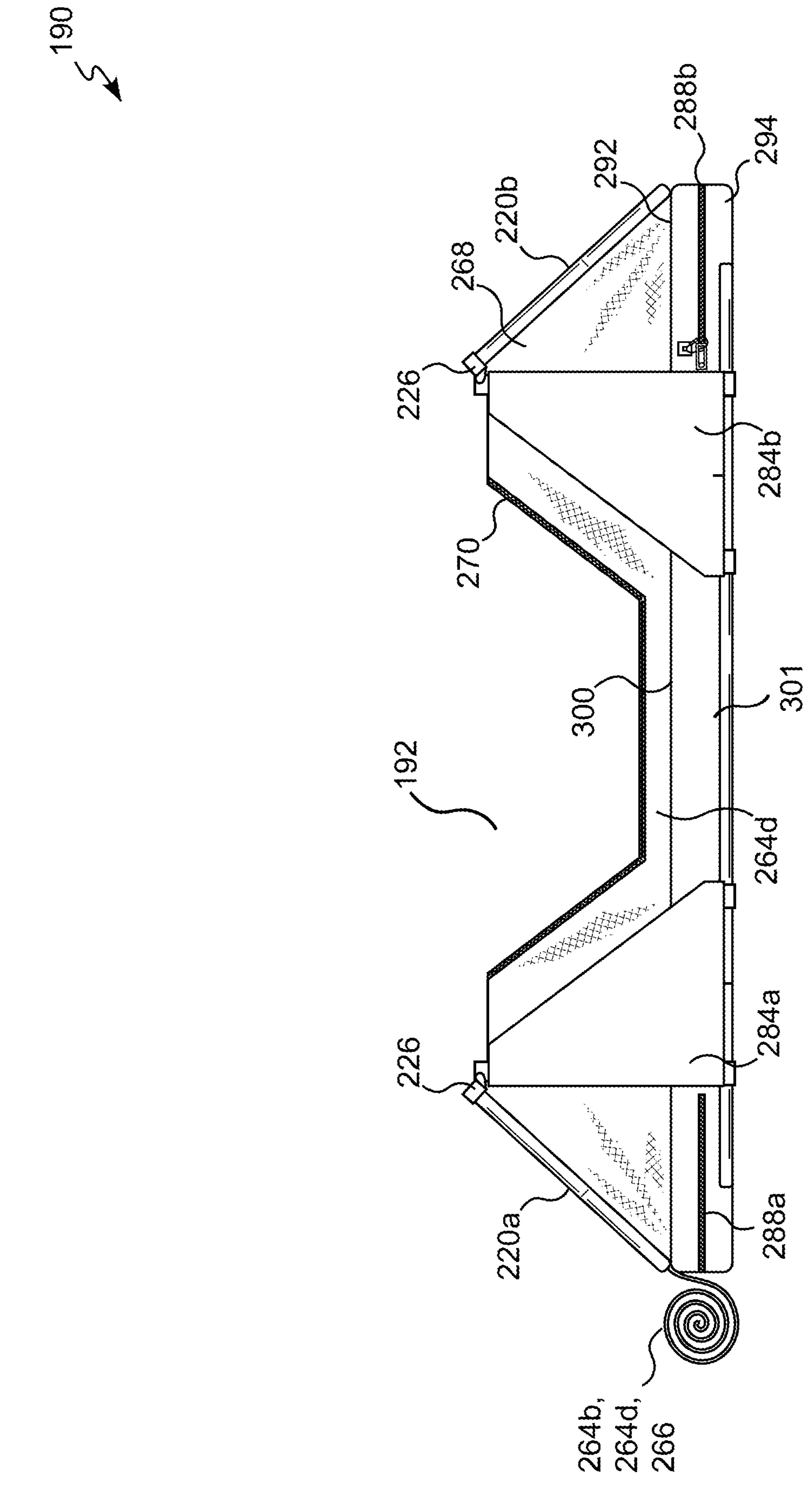
FIG. 34 is a front view of the portable confinement device of FIG. 15 in the unhinged position.
Figure 35:
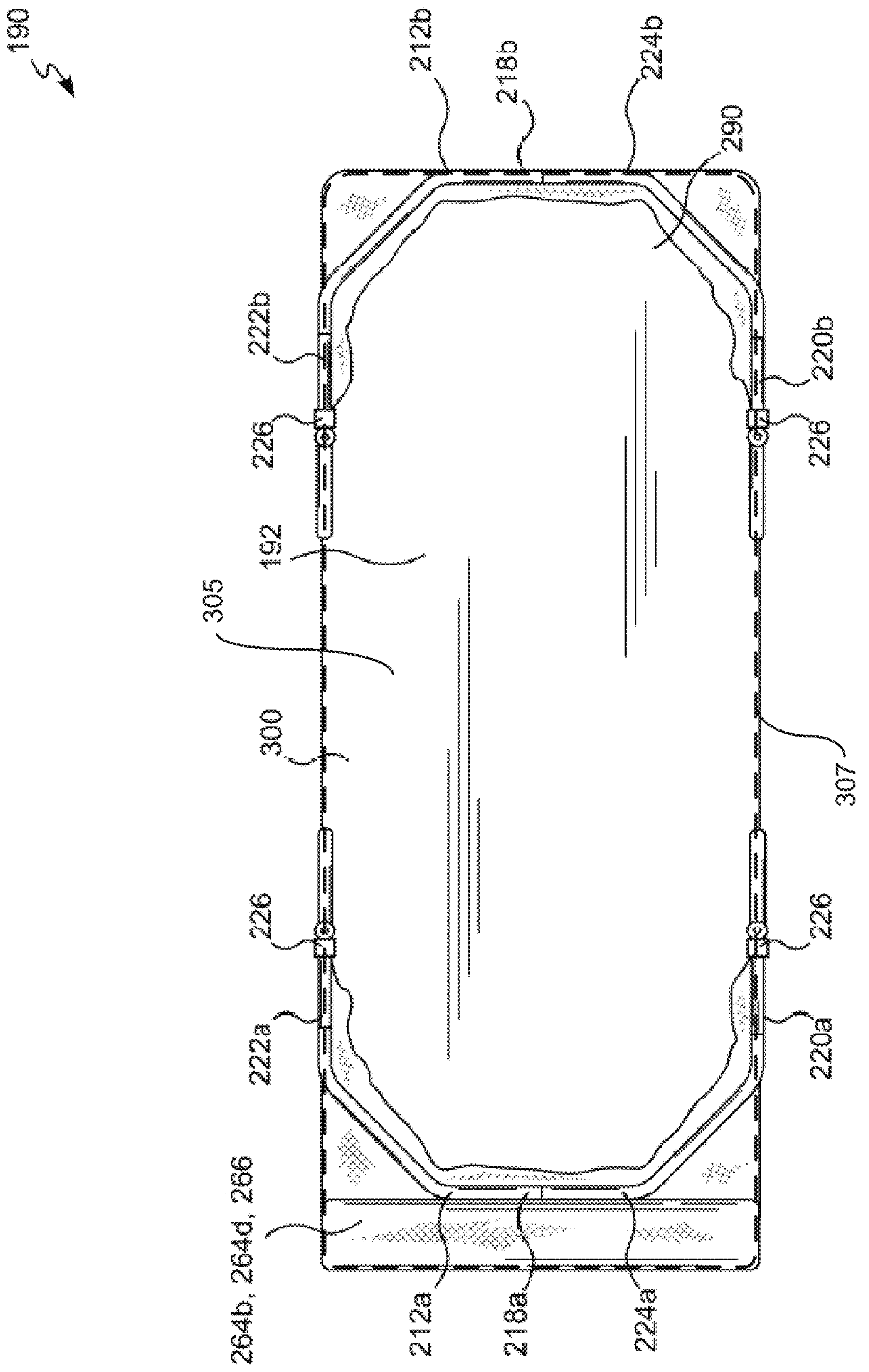
FIG. 35 is a top view of the portable confinement device of FIG. 15 in the unhinged position.

With continued reference to FIGS. 15 and 26-40, the fastenable opening 270 can be fastened or unfastened when the bridge portions 218*a*, 218*b* are in the upright position. When unfastened, the roof 266 and sides 264*b*, 264*d* of the flexible enclosure 260 can be rolled back, away from the enclosure, falling against the first side 264*a* of the flexible enclosure 260, as shown in FIGS. 30-32. When unfastened, the opening permits a user of the confinement device 190 to move the bridge portions 218*a*, 218*b* into the downward position by operating the lockable hinges 226. By moving the bridge portions 218*a*, 218*b* into the downward positions, the opening 270 created by the confinement device 190 grows wider and may expose the entirety of or a large portion of the mattress 290 from above permitting a user to replace the mattress within the enclosure and/or to raise or lower an individual into or out of the confinement device 190. This is shown in FIGS. 33-35. Entering or exiting the confinement device 190 can be done manually or with the use of a hoisting device, such as a crane (not shown). After a user has entered the confinement device 190, the bridge portions 218*a*, 218*b* may be returned to their upright position, and the fastenable opening 270 may be closed around the user in the opposite direction in which it was opened.

Referring now to FIGS. 15, 26, 28, 32, and 36A and 36B, the enclosure 260 is supported by the frame 200 in an attachable manner. As shown, only the roof of the enclosure 260 is attached to the frame 200. Padded pockets 280*a*, 280*b* may extend from the roof 266 of the enclosure 260 near sides 264*a*, 264*c*, or the padded pockets 280*a*, 280*b* may extend from the sides 264*a*, 264*c* of the enclosure 260 near the roof 266. In either instance, the padded pockets 280*a*, 280*b* encircle portions of the frame 200 in order to support the enclosure 260 on the frame 200. The padded pockets 280*a*, 280*b* may extend around as much or as little of the frame 200 as necessary in order to secure the enclosure 260 to the frame 200. The padded pockets 280*a*, 280*b* may wrap around the cross members 224*a*, 224*b* and/or the first legs 220*a*, 220*b* and second legs 222*a*, 222*b*. As shown, the padded pockets 280*a*, 280*b* wrap around each of these frame 200 elements. The padded pockets 280*a*, 280*b* have padding sewn inside of each so as to protect a user of the confinement device 190 as well as individuals on the outside from being injured by contacting or striking the portions of the frame 200 covered by the padded pockets 280*a*, 280*b*.

The padded pockets 280*a*, 280*b* are secured around the cross members 224*a*, 224*b* and the first legs 220*a*, 220*b* and second legs 222*a*, 222*b* by way of two pocket fasteners 282*a*, 282*b*. The padded pockets 280*a*, 280*b* extend in a direction away from the side along which they are aligned, and wrap around and encircle the cross members 224*a*, 224*b*, first legs 220*a*, 220*b*, and second leas 222*a*, 222*b*. After wrapping around these parts of the frame 200, the pocket fasteners 282*a*, 282*b* secure the padded pockets 280*a*, 280*b* in place. Corresponding halves of the pocket fasteners 282*a*, 282*b* are located on opposing sides of the cross members 224*a*, 224*b* when the padded pockets 280*a*, 280*b* are unfastened.

Figure 36A:
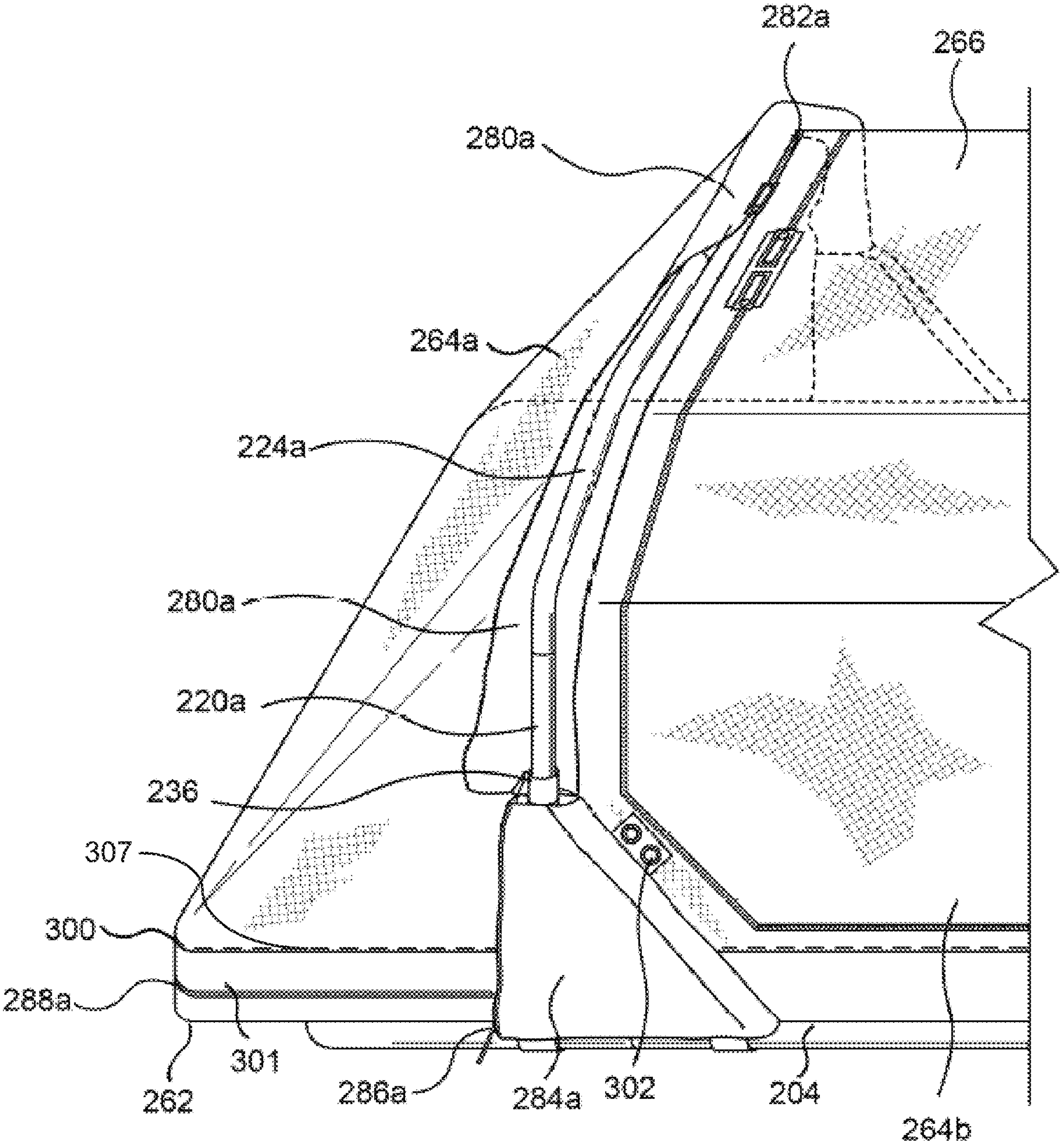
FIG. 36A is a side view of a portable confinement device according to one embodiment of the present disclosure.
Figure 36B:
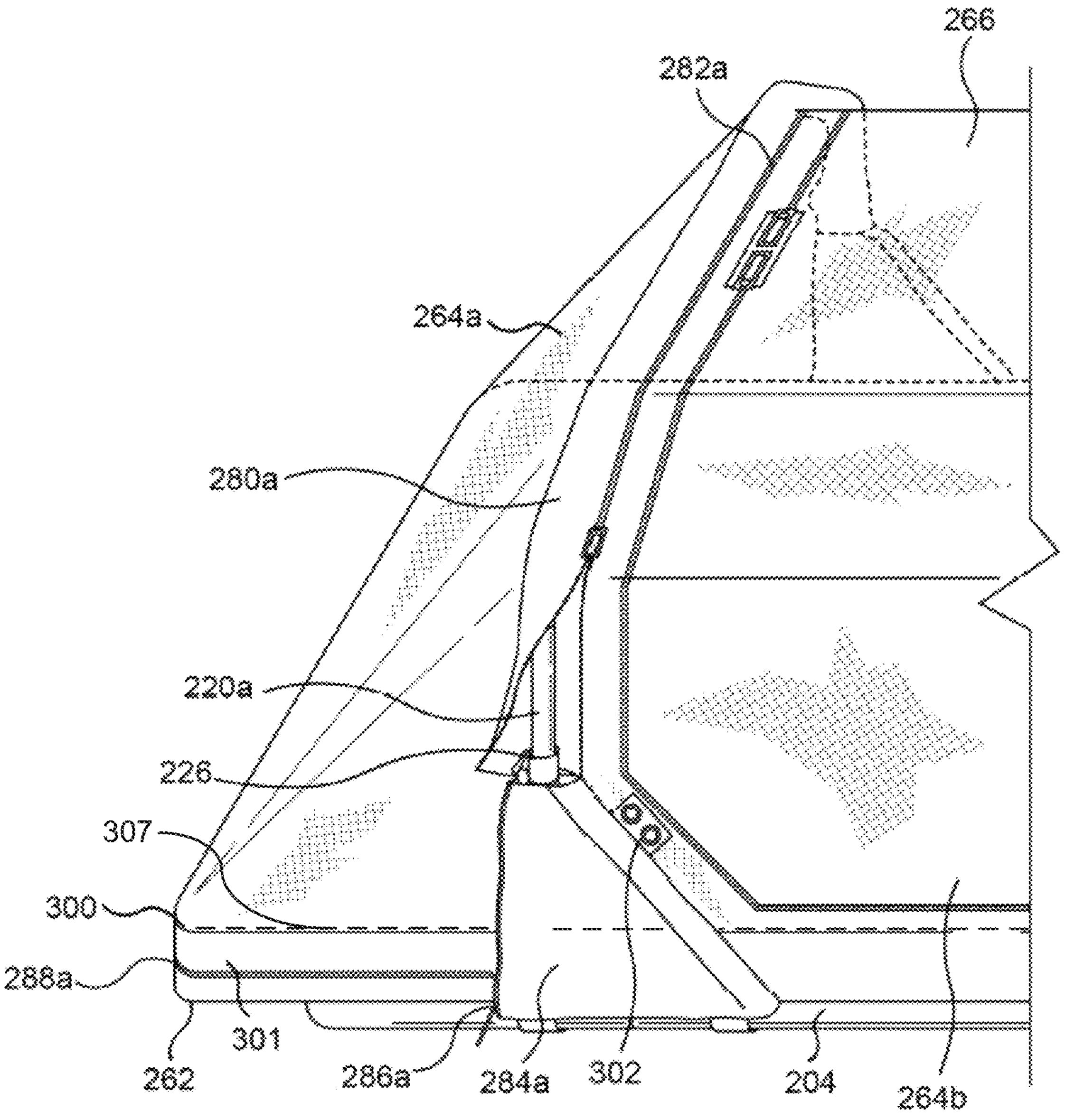
FIG. 36B is another side view of the portable confinement device of FIG. 36A.

Like the fastenable opening 270 and the side opening 274, the pocket fasteners 282*a*, 282*b* are shown as zippers, but they may be a different known fastener. As shown in FIGS. 36A and 36B, the pocket fastener 282*a* is zipped along its entire length to secure the enclosure 260 to the frame 200. The pocket fastener 282*a* is zipped along its length starting on the fourth side 264*d*, extending upward to the roof 266, across the roof 266, and then downward along the second side 264*b* where the pocket fastener 282*a* terminates. The pocket fastener 282*a* may also be zipped in the opposite direction. While only pocket fastener 282*a* is shown, both pocket fasteners 282*a*, 282*b* may begin and terminate at a location adjacent to the lockable hinges 226, so that, after unfastening the pocket fasteners 282*a*, 282*b* enough so as to expose the lockable hinges 226, the lockable hinges 226 can be operated and the bridge portions 218*a*, 218*b* can be moved to the downward position. In the case of button hinges 226, the button hinges 226 may be operated by pushing the button 238 through the pocket fasteners 282*a*, 282*b* while the button hinges 226 are enclosed within by the pocket fasteners 282*a*, 282*b*. Depending on the size of the frame 200, multiple pocket fasteners 282*a*, 282*b* may be utilized on each side of the flexible enclosure 260. When multiple pocket fasteners 282*a*, 282*b* are used, they may begin and end at a location along the second side 264*b* and the fourth side 264*d* and near a center point along the roof 266.

While only the roof 266 of the enclosure 260 attaches to the frame 200 for support, other portions of the enclosure 260 may have fasteners, buttons, ties or other attachment mechanisms in order to secure the enclosure 260 to the frame. For example, the bottom 262 of the enclosure 260 may have straps (not shown) in order to secure the enclosure 260 to the base 202 of the frame 200.

Figure 28:
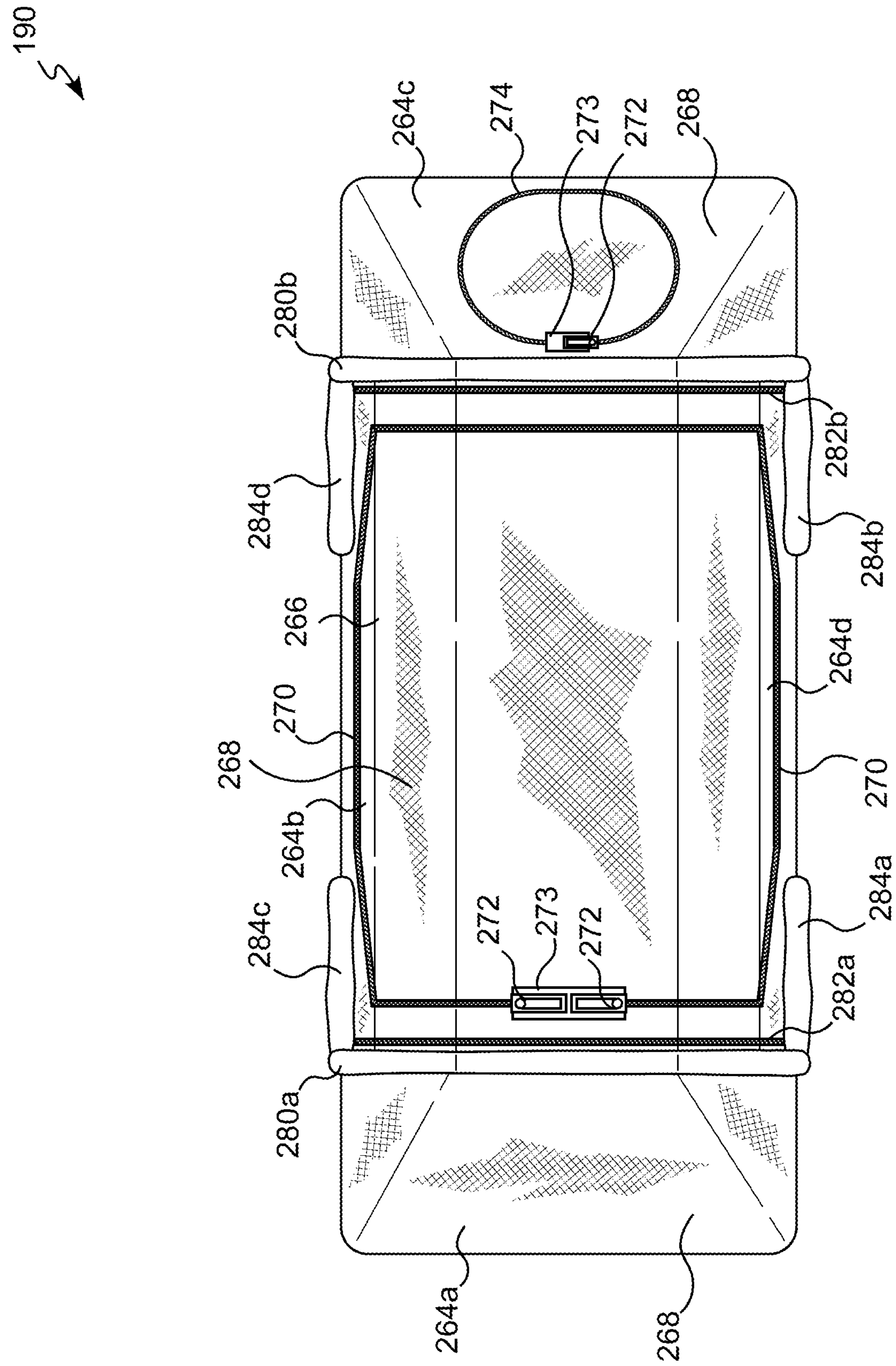
FIG. 28 is a top view of the portable confinement device of FIG. 15.
Figure 29:
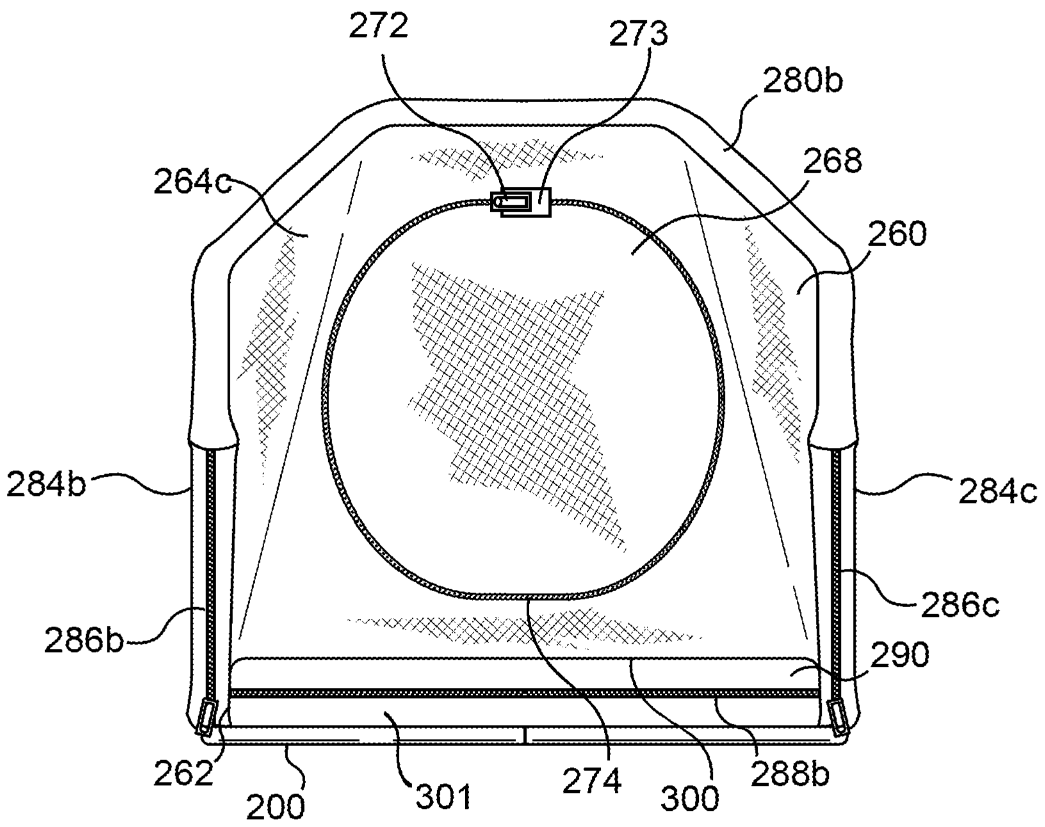
FIG. 29 is a side view of the portable confinement device of FIG. 15.

With reference to FIGS. 36A-37B, stabilizer pads 284*a*, 284*b* may wrap around and cover the generally triangular shape formed by the connected stabilizing members 228*a*, 228*b*, first supports 214*a*, 214*b*, and the portion of the first side 204 of the base 202 extending therebetween. As shown in FIGS. 28 and 32, identical stabilizer pads 284*c*, 284*d* may be included for the generally triangular shape formed by the stabilizing members 228*c*, 228*d*, second supports 216*a*, 216*b*, and the portion of the second side 206 of the base 202 extending therebetween. Like the padded pockets 280*a*, 280*b*, the stabilizer pads 284*a*, 284*b* also have padding sewn inside of them in order to prevent individuals, whether inside the confinement device 100 or not, from injury by contacting the first supports 214*a*, 214*b*, the second supports 216*a*, 216*b*, or the stabilizing members 228*a*, 228*b*, 228*c*, 228*d*.

Figure 37A:
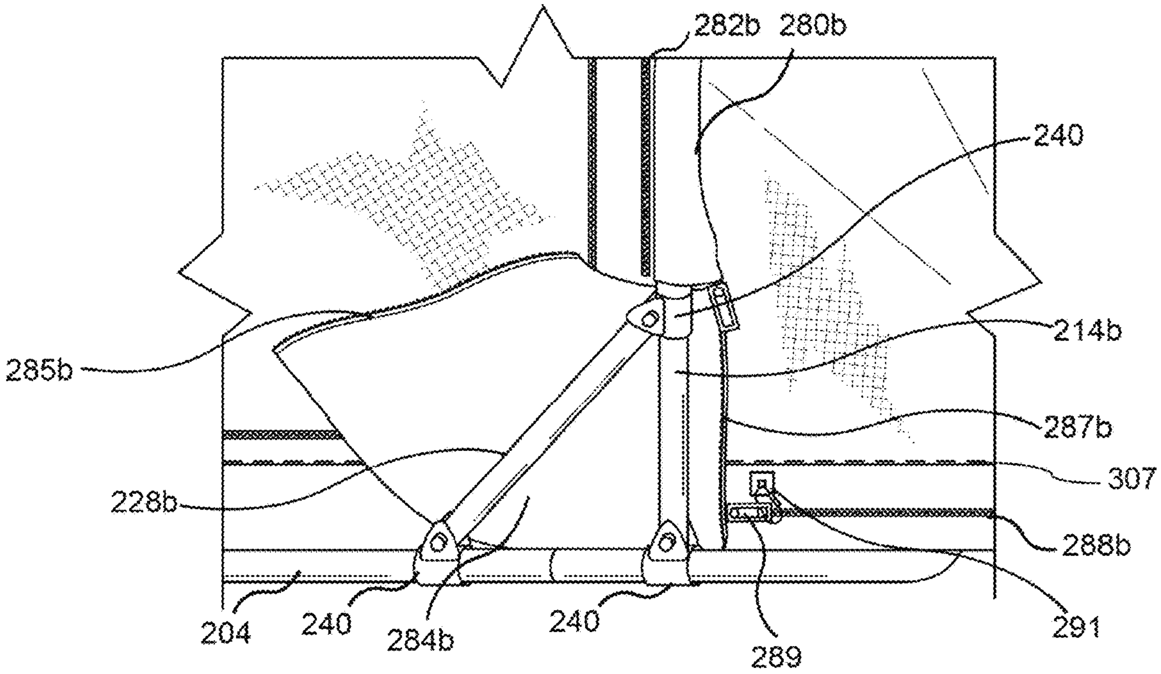
FIG. 37A is a side view of a portable confinement device according to another embodiment of the present disclosure.
Figure 37B:
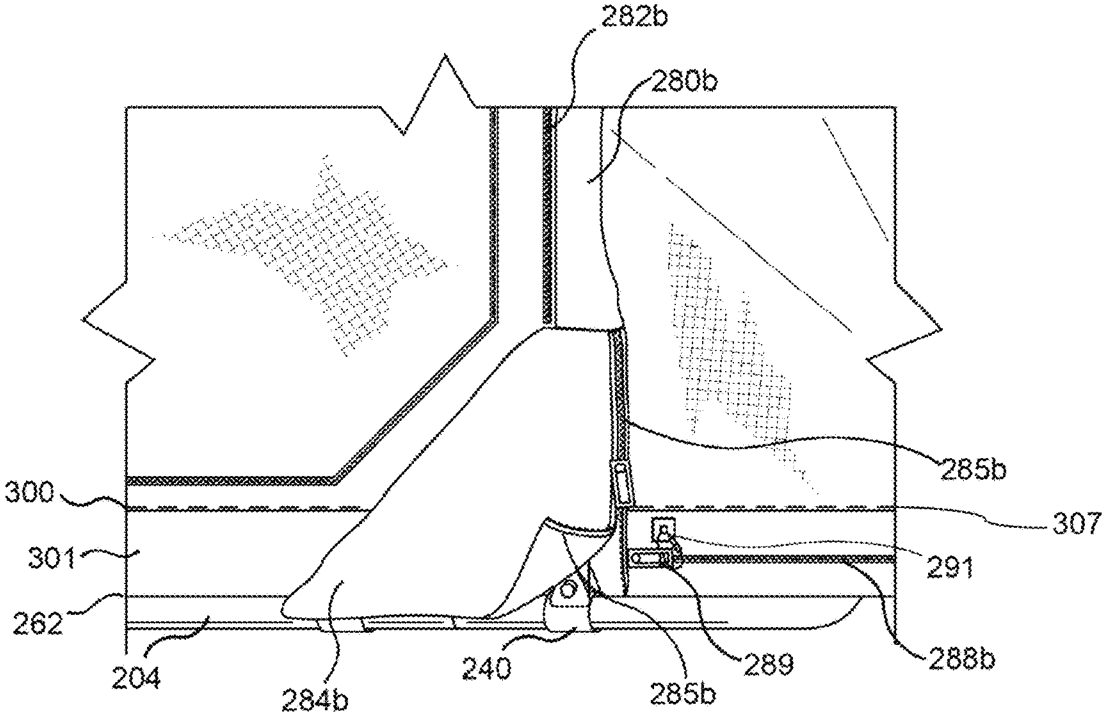
FIG. 37B is a side view of the portable confinement device of FIG. 37A.

The stabilizer pads 284*a*, 284*b* are formed independently of the enclosure 260. As shown in FIGS. 37A and 37B, when attaching the stabilizer pad 284*b* to the frame 200, the stabilizer pad 284*b* wraps behind and around the first support 214*b* and the stabilizing member 228*b* on the side of the first support 214*b* and the stabilizing member 228*b* nearest the enclosure 260. The stabilizer pad 284*b* then wraps back around and in front of the stabilizing member 228*b* and the first support 214*b* so that the free ends 285*b*, 287*b* of the stabilizer pad 284*b* can be fastened together, thus enclosing the first support 214*b*, stabilizing member 228*b*, and associated eye-and-pin connector 240 within the stabilizer pad 284*b*. The size of the stabilizer pad 284*b* is such that at least a portion of the first side 204 of the base and eye-and-pin connectors 240 attached thereto is covered by the stabilizing pad 284*b* when fastened. Like the previous fasteners described and shown herein, the free ends 285*b*, 287*b* of the stabilizer pad 284*b* are fastened together with a fastener 286*b* that is a zipper, although other fasteners may be used. The free ends 285*b*, 287*b* of the stabilizer pad 284*b* may each have half of the corresponding fastener **286*b* thereon. In this instance, corresponding halves of the zipper is attached to the free ends 285*b*, 287*b*. When the free ends 285*b*, 287*b* are brought back into contact after wrapping around the first support 214*b* and the stabilizing member 228*b*, the fastener 286*b* may be secured by being zipper along the length of the first support 214*b*. Although only one stabilizer pad 284*b* is shown, it is understood that this is illustrative of how the other stabilizer pads 284*a*, 284*c*, 284*d* are secured around the support frame 200**.

Referring again to FIGS. 15 and 26-40, the flexible enclosure 260 is constructed of strong, durable materials so that it is effective in confining a person and can be used daily for weeks, months, or even years. Any suitable materials known to persons skilled in the art may be used for making the enclosure 260. The materials are preferably fire retardant. A particularly preferred material is a polyester mesh for the windows 268 and canvas for the non-mesh portions. FIG. 1 shows the flexible enclosure 260 with a mesh roof 266. FIG. 26 shows that the roof 266 of the enclosure 260 may be made of a canvas or another opaque material.

Referring to FIGS. 15, 26, 27, 29-31, 33, 34, 36A-37, and 40, mattress fasteners **288*a*, 288*b* are located near the bottom 262 of the enclosure 260. The mattress fastener 288*a* extends from the second side 264*b* to the fourth side 264*d*, crossing the first side 264*a* in the process. The mattress fastener also extends from the second side 264*b* to the fourth side 264*d* while crossing the third side 264*c*. The mattress fasteners 288*a*, 288*b* open to a pocket 301 within the enclosure 260 configured to receive the mattress 290 therein. When the confinement device 190 includes the mattress fasteners 288*a*, 288*b*, the mattress 290 may be received entirely within the pocket 301, unexposed to the interior space 192. A floor 300 of the interior space 192 covers the mattress 290. The floor 300 serves as a coverlet 305 to the mattress 290. The pocket 301 is therefore defined by the floor 300/coverlet 305 and the bottom 262 of the enclosure 260. The coverlet 305 has a fastening mechanism 307 configured to secure the coverlet 305 to the four sides 264*a*, 264*b*, 264*c*, 264*d*. The fastening mechanism 307 is identified with dashed lines FIGS. 35-37B. The mattress fasteners 288*a*, 288*b* serve to connect the floor 300 to the bottom 262. This configuration prevents an individual within the confinement device 190 from accessing the mattress 290. Like the other fasteners described herein, the mattress fasteners 288*a*, 288*b* are shown as zippers, but other fasteners known to those having skill in the art may be used. When the mattress fasteners 288*a*, 288*b* are closed, the respective zipper handles 289 of the mattress fasteners 288*a*, 288*b* are located cater-corner to each other relative to the confinement device 190. In other words, a first zipper handle 289 is located nearest the corner made by the third side 264*c* and the fourth side 264*d*, while a second zipper (not shown) is located nearest the corner made by the first side 264*a* and the second side 264*b***.

With reference to FIGS. 37A and 37B, the first zipper handle 289 of mattress fastener **288*b* is shown. In order to prevent an individual from accessing the pocket 301, a clip 291 is provided on and attached to the outside of the enclosure 266. The clip 291 may engage with and clip the zipper handle 289 in order to secure it, so that the mattress zipper 288*b* remains closed. This prevents an individual from accessing the pocket 301 and potentially getting trapped between the floor 300 and the bottom 262 of the enclosure 260**.

Figure 38:
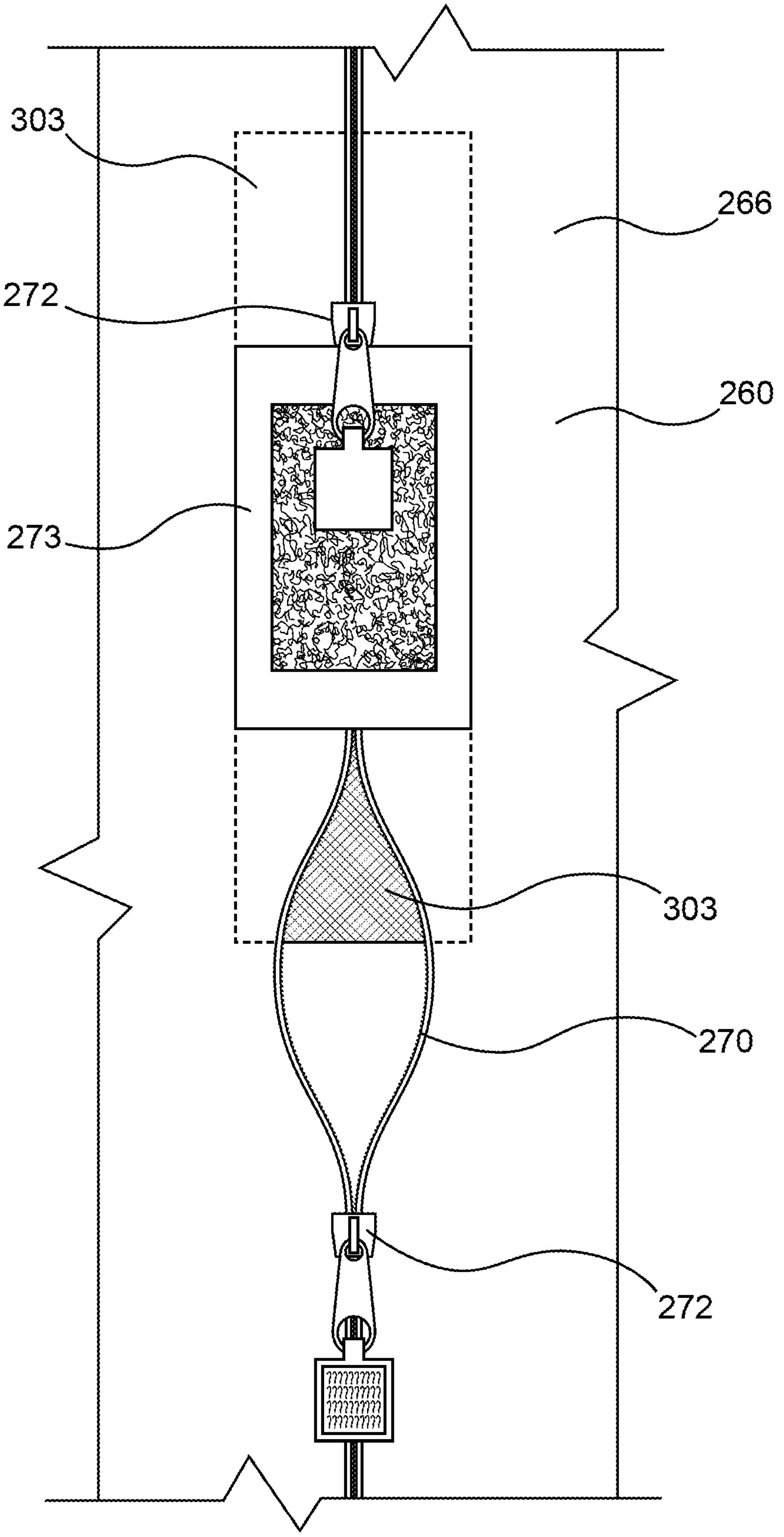
FIG. 38 is a partial top view of the portable confinement device of FIG. 15 according to one embodiment of the present disclosure.

Referring now to FIG. 38, another security feature for the openings 270, 274 and zipper handles 272 of the confinement device 190 is shown. This feature is in the form of a webbing 303 sewn into or otherwise attached to the inside of the enclosure 260. For example, the webbing 303 may be sewn onto the underside of the roof 266 of the enclosure 260 and be open to the interior space 192. The webbing 303 may be made of mesh, vinyl, cloth, or other materials known to those having skill in the art. As shown, the webbing 303 extends from end portions of the Velcro® strip 273 on the roof 266 and covers the arears near the starting and end points of the fastenable opening 270. The webbing 303 covers the starting and end areas of the fastenable opening 270 so that the zipper handles 272 cannot be manipulated or opened by an individual within the interior space 192 of the confinement device 190 when the fastenable opening 270 is closed and the zipper handles 272 are secured to the Velcro® strip 273. When closed, the underside of the zipper handles 272 are not exposed to the interior space 192. In order to do this, the webbing 303 extends at least a finger's length or a hand's length from the Velcro® strip 273 in order to prevent the individual from grabbing the back of the zipper handles 272 from the interior space 292 in order to pull the zipper handles 272 down and open the fastenable opening 270. The webbing 303 may also be attached to the enclosure 260 directly underneath and adjacent to the fastenable opening 270 so that there is no space between the webbing 303 and the enclosure 260 between which the individual can gain access. The webbing 303 may be made of any material thick enough to sufficiently cover the zipper handles 272 and prevent the individual inside the interior space 192 from manipulating the zipper handles 272 through the webbing 303. While FIG. 38 shows the zipper handles 272 and fastenable opening 270 on the roof 266 of the enclosure, it is understood that the webbing 303 can be applied under other zipper handles 272 of the confinement device 190, such as the zipper handles 272 on the side opening 274 of the enclosure 290.

Figure 39:
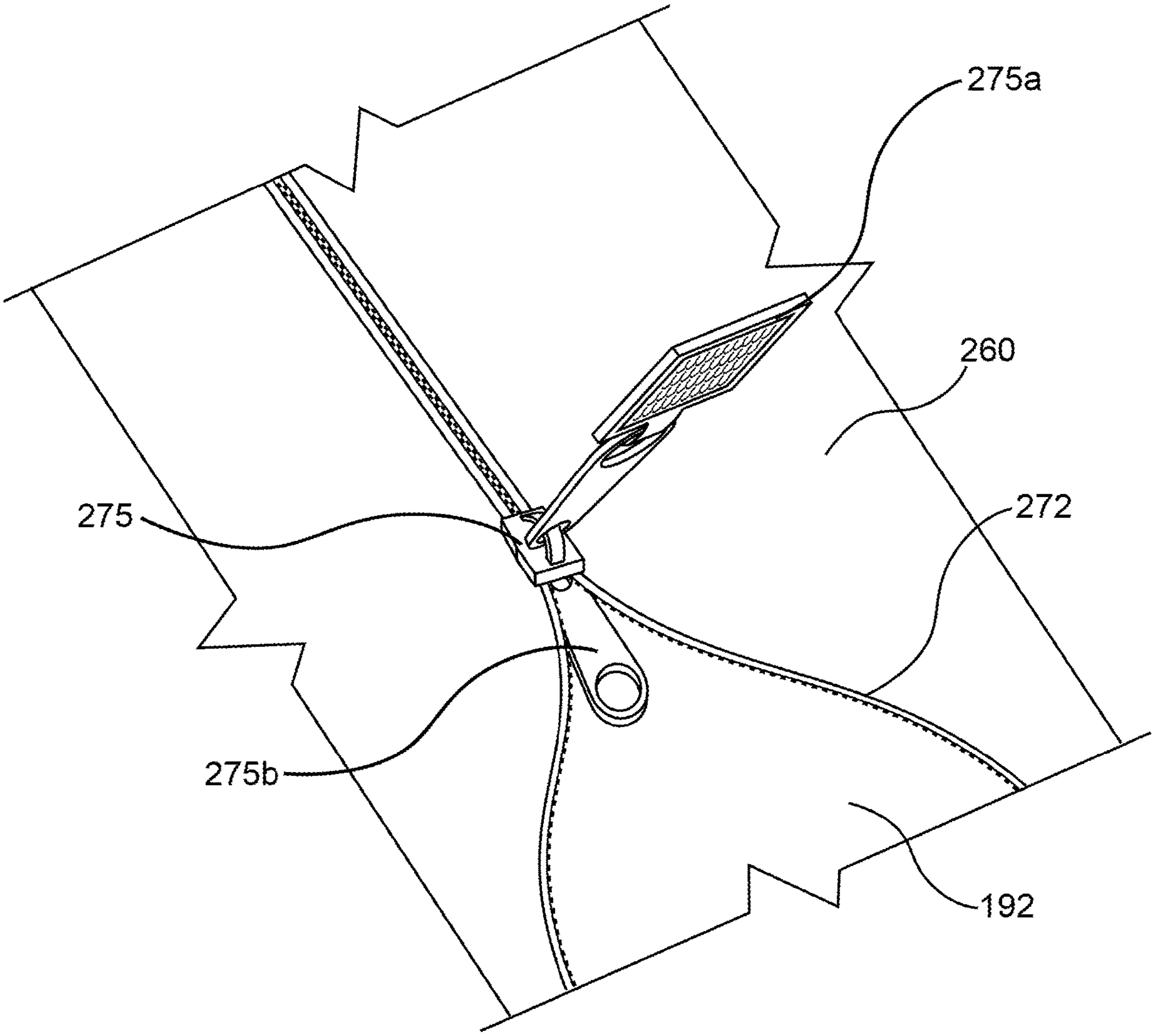
FIG. 39 is a partial perspective view of an opening of the portable confinement device of FIG. 15 according to one embodiment of the present disclosure.

Referring now to FIG. 39, a second embodiment of the zipper handle 275 is shown. This embodiment includes a handle 275 having two parts. An outside handle **275*a* includes the Velcro® strip corresponding to the Velcro® strips 273 on the enclosure 260, and operates as the zipper handles previously described. The inside handle 275*b* extends into the interior space 192. The fastenable openings 270, 274 with this handle 275 may operate as each of the fastenable openings 270, 274 described above, but the inside handle 275*b* permits an individual within the interior space 192 to operate the zipper handles 274 of the enclosure permitting the individual to enter and leave the enclosure 290** at their discretion.

Figure 40:
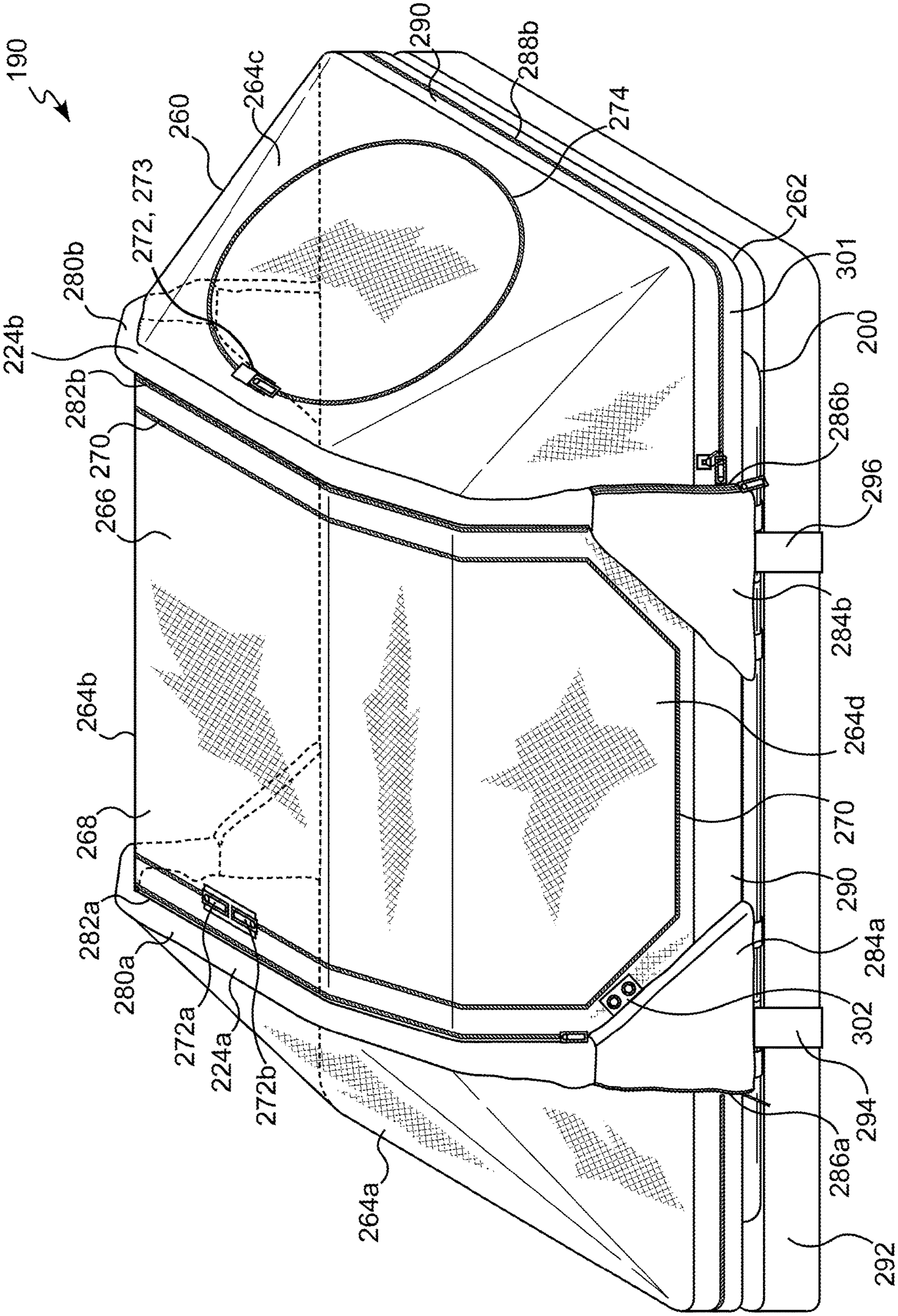
FIG. 40 is a perspective view of a portable confinement device according to another embodiment of the present disclosure.

Referring now to FIG. 40, the confinement device 190 may rest atop a box spring 292. In this instance, the base 202 of the frame 200 may be provided with stabilizing straps 294, 296 which extend from the first side 204 across to the second side 206. The stabilizing straps 294, 296 are configured to wrap around the box spring 292 in order to secure the confinement device 190 thereto. The stabilizing straps 294 may also wrap around a bed frame (not shown) upon which the box spring 292 sits. In this configuration, the confinement device 190 may be secured and prevented from tipping over. This provides extra stabilizing support for the confinement device 100 so that it may remain upright. It is further contemplated that additional stabilizing straps may extend from the third side 208 across to the fourth side 210 of the base 202 of the frame 200 in order to further secure the confinement device 190 to the box spring 292.

Referring to FIGS. 15, 26, 27, 30, 31, 36A, 36B, and 40 the flexible enclosure 260 may also have one or more access ports 302. These access ports 302 facilitate a connection between the user of the confinement device 190 and various assistance devices such as medical instruments, tools, or tubes (not shown). For example, a feeding tube, pulse oximeter, intravenous line, or other device can be connected to or placed through the access ports 302 in order to connect to or connect with a user inside the confinement device 190. This provides added health benefits and may increase comfort for the user inside of the confinement device 190. The access ports 302 are shown on the fourth side 264*d* of the enclosure 260, although they may be placed on other sides 264*a*, 264*b*, 264*d* of the enclosure 260 or on multiple sides as desired. It is contemplated that the access ports 302 may be operable in any manner in order to provide the necessary assistance to a user of the confinement device 190. For example, the access ports 302 may be a zipper, slotted webbing, button or Velcro® opening. The access ports 302 may be any size depending on the assistance device connected to the access ports 302.

Figure 41A:
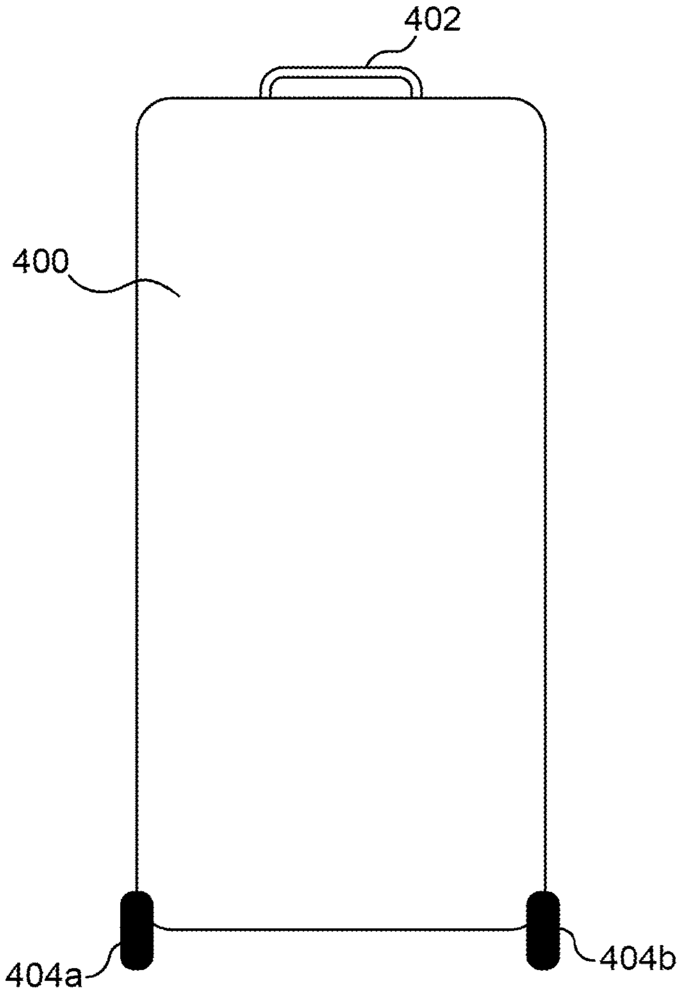
FIG. 41A is side view of a suitcase.
Figure 41B:
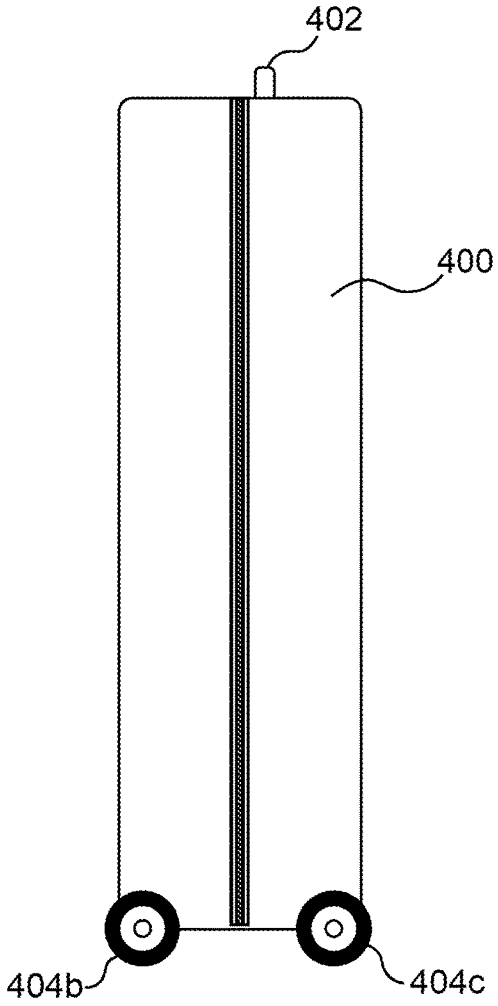
FIG. 41B is a side view of the suitcase of FIG. 39A.
Figure 42:
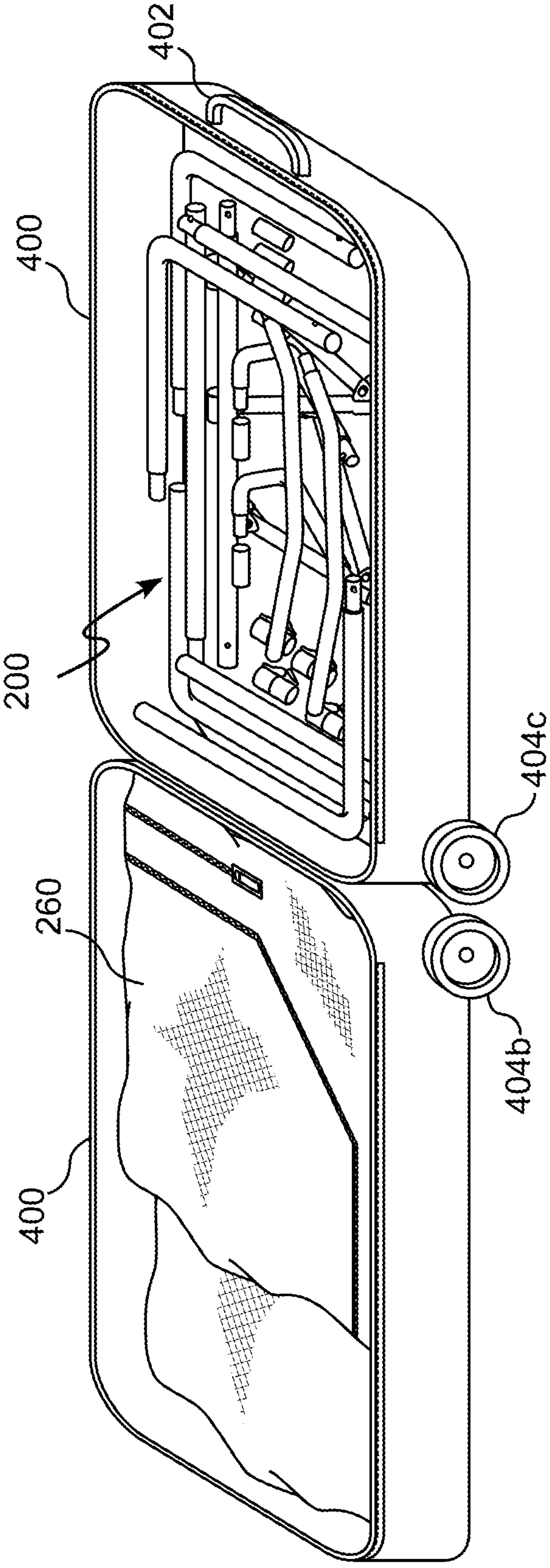
FIG. 42 is a perspective view of the suitcase of FIG. 39A in an open position with a portable confinement device disposed therein according to another embodiment of the present disclosure.

Referring now to FIGS. 41A-42, the portable confinement device 190 is designed to fit into a suitcase 400 or other portable storage device for storage and transportation of the portable confinement device 190. As discussed in connection with FIG. 24, the portable confinement device 190 may be broken down into its respective pieces in order to transport the portable confinement device 190 within the suitcase 400. The suitcase 400 includes a handle 402 and four wheels 404*a*, 404*b*, 404*c*, 404*d* (wheel 404*d* not shown) for easy travel. The suitcase 400 has an interior 406 large enough to contain the broken down frame 200 and the flexible enclosure 260.

Although the invention has been described in detail for the purpose of illustration based on what are currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that to the extent possible, one or more features of any aspect or embodiment can be combined with one or more features of any other aspect or embodiment.

What is claimed is:

1. A portable confinement device for confining a person upon a mattress, the device comprising:

a frame comprising:

a base member comprising a first side and a second side parallel to the first side and set apart from the first side at a distance; and at least two upright members connected to the base member, each upright member comprising a first support portion, a second support portion, and a bridge portion, the bridge portion comprising a first leg, a second leg parallel to the first leg, and a cross member connecting the first and second legs, wherein the first leg and the second leg are respectively connected to the first support portion and the second support portion by lockable hinges, and wherein, when the hinges are locked, the bridge portion is configured to be in an upright position, and when the hinges are unlocked, the bridge portion is rotatable into a downward, lowered position; and a flexible enclosure comprising a floor, four sides, and a roof defining an interior space, wherein the flexible enclosure is configured to be supported by the frame and adapted to receive the mattress therein, and wherein a first fastenable opening extends across at least one of the four sides and the roof in order to permit a person to enter and exit the interior space when the bridge portion is in either the upright or the downward position.

2. The portable confinement device of claim 1, wherein the base member further comprises a third side and a fourth side interconnecting the first side and the second side.

3. The portable confinement device of claim 2, wherein the third side and the fourth side of the base member interconnect the first side and the second side by way of a swaged connection.

4. The portable confinement device of claim 1, wherein the cross members of the at least two upright members connect to the first leg and the second leg of the at least two upright members by way of a swaged connection.

5. The portable confinement device of claim 1, further comprising at least four stabilizing members removably attached to the base member and one of the first support portions or the second support portions.

6. The portable confinement device of claim 1, wherein the frame further comprises a plurality of eye-and-pin connectors in order to connect the at least two upright members to the base member.

7. The portable confinement device of claim 1, wherein the portable confinement device further comprises a mattress and wherein, when the bridge portion is in the upright position, the at least two upright members and the mattress form a substantially hexagonal shape.

8. The portable confinement device of claim 1, wherein, when the bridge portion is in the upright position, the at least two upright members and the mattress form a substantially rectangular shape.

9. The portable confinement device of claim 1, wherein the lockable hinges are button hinges.

10. The portable confinement device of claim 1, wherein the flexible enclosure further comprises at least one access port.

11. The portable confinement device of claim 10, wherein the at least one access port is configured to connect to an assistance device for use by a person confined in the portable confinement device.

12. The portable confinement device of claim 1, wherein the flexible enclosure further comprises a plurality of pockets for receiving at least a portion of the bridge portions of the at least two upright members therein.

13. The portable confinement device of claim 1, wherein the enclosure has a fastenable second opening through which the mattress may be placed into or removed from the enclosure interior space.

14. The portable confinement device of claim 13, wherein the flexible enclosure further comprises a pocket defined by a top side of the floor of the flexible enclosure and a mattress covering, wherein the mattress covering creates a floor of the interior space and is configured to prevent the person confined by the interior space from accessing the mattress.

15. The portable confinement device of claim 1, wherein the flexible enclosure further comprises a second fastenable opening on at least one of the four sides, wherein the second fastenable opening is configured to permit a person to enter and exit the interior space when the bridge portion is in the upright position.

16. The portable confinement device of claim 1, wherein, when the lockable hinges are locked, the bridges are set apart by a first distance, and when the lockable hinges are unlocked, the bridges are set apart by a second distance, greater than the first distance.

17. A portable confinement device for confining a person upon a mattress, the portable confinement device comprising:

a mattress;

a frame comprising a base section interconnected to a first upright portion and a second upright portion, wherein the first and second upright portions further comprise a first leg, a second leg, and a bridge interconnected to the first and second legs by two lockable hinges, the bridges being set apart by a distance; and a flexible enclosure having a floor, four sides, and a roof defining an interior space, wherein the flexible enclosure is configured to be supported by the frame and adapted to receive the mattress, and wherein at least one of the four sides and the roof has a fastenable first opening to permit a person to enter and exit the interior space, wherein, when the hinges are locked, the bridges are set apart by a first distance, and when the hinges are unlocked, the bridges are set apart by a second distance, greater than the first distance, and wherein the two lockable hinges are button hinges.

18. The portable confinement device of claim 17, wherein the flexible enclosure further comprises at least one access port.

19. The portable confinement device of claim 18, wherein the at least one access port is configured to connect to an assistance device for use by the person confined in the portable confinement device.

20. The portable confinement device of claim 17 wherein, when the hinges are unlocked, the fastenable first opening is configured to expose the entirety of the mattress.

21. portable confinement device for confining a person upon a mattress, the device comprising:

a frame comprising at least two upright members, each upright member comprising a first support portion, a second support portion, and a bridge portion, the bridge portion comprising a first leg, a second leg parallel to the first leg, and a cross member connecting the first and second legs, wherein the first leg and the second leg are respectively connected to the first support portion and the second support portion by locking hinges, and wherein, when the hinges are locked, the bridge portion is configured to be in an upright position, and when the hinges are unlocked, the bridge portion is rotatable into a downward, lowered position; and a flexible enclosure configured to be supported by the frame, the flexible enclosure comprising:

a floor;

the floor serving as a coverlet;

a roof;

and four sides extending between the coverlet, and the roof;

wherein the coverlet comprises a fastening mechanism configured to secure the coverlet to the four sides, wherein the coverlet, the roof, and a first portion of the four sides define a first interior space adapted to confine a person therein, wherein at least one of the four sides and the roof include a fastenable first opening configured to permit a person to enter and exit the first interior space, wherein the coverlet and a second portion of the four sides define a second interior space adapted to receive a mattress therein, wherein the fastening mechanism is accessible via the second interior space, and wherein the fastening mechanism is arranged on the coverlet so that, when a person is confined within the first interior space, the fastening mechanism is inaccessible to the person confined within the first interior space.

22. The flexible enclosure of claim 21, wherein at least one of the four sides or the floor comprises a securing mechanism configured to secure the fastening mechanism against the at least one of the four sides or the floor.

23. The flexible enclosure of claim 21, wherein the fastening mechanism comprises a zipper.

* * * * *